US011923983B2

(12) United States Patent
Elshafie et al.

(10) Patent No.: US 11,923,983 B2
(45) Date of Patent: Mar. 5, 2024

(54) COMMUNICATION OF A STATUS BIT FOR DEFERRED HYBRID AUTOMATIC REPEAT REQUEST FEEDBACK

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US); Peter Gaal, San Diego, CA (US); Wanshi Chen, San Diego, CA (US); Seyedkianoush Hosseini, San Diego, CA (US); Juan Montojo, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/479,804

(22) Filed: Sep. 20, 2021

(65) Prior Publication Data

US 2022/0103297 A1     Mar. 31, 2022

Related U.S. Application Data

(60) Provisional application No. 63/083,730, filed on Sep. 25, 2020.

(51) Int. Cl.
*H04L 1/1607*     (2023.01)
*H04W 28/04*     (2009.01)

(52) U.S. Cl.
CPC ........... *H04L 1/1607* (2013.01); *H04W 28/04* (2013.01)

(58) Field of Classification Search
CPC ...................................................... H04W 28/04
See application file for complete search history.

(56) References Cited

U.S. PATENT DOCUMENTS

| 10,182,420 | B2 * | 1/2019 | Tiirola | H04L 5/001 |
| 2006/0034277 | A1 * | 2/2006 | Jang | H04L 1/1614 |
| | | | | 370/389 |
| 2010/0210256 | A1 * | 8/2010 | Shen | H04L 1/1614 |
| | | | | 455/422.1 |
| 2011/0141878 | A1 * | 6/2011 | Che | H04L 1/0025 |
| | | | | 370/216 |
| 2018/0254877 | A1 * | 9/2018 | Wang | H04L 1/1854 |
| 2019/0074952 | A1 * | 3/2019 | Bhattad | H04L 1/1822 |

* cited by examiner

*Primary Examiner* — Benjamin Lamont
(74) *Attorney, Agent, or Firm* — Loza & Loza LLP / Qualcomm

(57) ABSTRACT

Aspects relate to providing a status bit to a base station, where the status bit indicates whether all of multiple downlink transmissions have been successfully decoded. In an aspect, a user equipment (UE) receives a plurality of downlink transmissions from a base station, and generates a plurality of acknowledgement data respectively for the plurality of downlink transmissions, each of the plurality of acknowledgement data indicating whether a respective downlink transmission of the plurality of downlink transmissions has been successfully decoded. The UE further transmits, to the base station, at least one status bit based on the plurality of acknowledgement data, the at least one status bit indicating whether all of the plurality of downlink transmissions have been successfully decoded.

29 Claims, 21 Drawing Sheets

COMMUNICATION OF A STATUS BIT FOR DEFERRED HYBRID AUTOMATIC REPEAT REQUEST FEEDBACK

PRIORITY CLAIM

This application claims priority to and the benefit of provisional patent application No. 63/083,730 filed in the United States Patent & Trademark Office on Sep. 25, 2020, the entire content of which is incorporated herein by reference as if fully set forth below in its entirety and for all applicable purposes.

TECHNICAL FIELD

The technology discussed below relates generally to wireless communication systems, and more particularly, to providing hybrid automatic repeat request (HARQ) feedback.

INTRODUCTION

When a user equipment (UE) receives a downlink transmission from a base station, the UE may provide acknowledgement data to the base station to indicate whether the downlink transmission has been successfully decoded by the UE or not. The acknowledgement data may be hybrid automatic repeat request (HARQ) feedback such as an acknowledgement (ACK) or negative acknowledgement (NACK). For example, if the integrity of the transmission is confirmed, the UE may transmit an ACK to the base station. On the other hand, if the integrity of the downlink transmission is not confirmed, the UE may transmit a NACK to the base station. If the base station receives the NACK, the base station may transmit a retransmission of the downlink transmission.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure relate to providing a status bit related to deferred HARQ feedback to a base station, where the status bit indicates whether or not all of the downlink transmissions associated with the deferred HARQ feedback have been successfully decoded.

In one example, a method of wireless communication by a user equipment (UE) is disclosed. The method includes receiving a plurality of downlink transmissions from a base station, generating a plurality of acknowledgement data respectively for the plurality of downlink transmissions, each of the plurality of acknowledgement data indicating whether a respective downlink transmission of the plurality of downlink transmissions has been successfully decoded, and transmitting, to the base station, at least one status bit based on the plurality of acknowledgement data, the at least one status bit indicating whether all of the plurality of downlink transmissions have been successfully decoded.

In another example, a UE for wireless communication is disclosed. The UE includes at least one processor, a transceiver communicatively coupled to the at least one processor, and a memory communicatively coupled to the at least one processor. The at least one processor may be configured to receive a plurality of downlink transmissions from a base station, generate a plurality of acknowledgement data respectively for the plurality of downlink transmissions, each of the plurality of acknowledgement data indicating whether a respective downlink transmission of the plurality of downlink transmissions has been successfully decoded, and transmits, to the base station, at least one status bit based on the plurality of acknowledgement data, the at least one status bit indicating whether all of the plurality of downlink transmissions have been successfully decoded.

In another example, a non-transitory computer-readable storage medium having instructions for UE thereon may be disclosed. The instructions, when executed by a processing circuit, cause the processing circuit to receive a plurality of downlink transmissions from a base station, generate a plurality of acknowledgement data respectively for the plurality of downlink transmissions, each of the plurality of acknowledgement data indicating whether a respective downlink transmission of the plurality of downlink transmissions has been successfully decoded, and transmit, to the base station, at least one status bit based on the plurality of acknowledgement data, the at least one status bit indicating whether all of the plurality of downlink transmissions have been successfully decoded.

In a further example, a UE for wireless communication may be disclosed. The UE includes means for receiving a plurality of downlink transmissions from a base station, means for generating a plurality of acknowledgement data respectively for the plurality of downlink transmissions, each of the plurality of acknowledgement data indicating whether a respective downlink transmission of the plurality of downlink transmissions has been successfully decoded, and means for transmitting, to the base station, at least one status bit based on the plurality of acknowledgement data, the at least one status bit indicating whether all of the plurality of downlink transmissions have been successfully decoded.

In one example, a method of wireless communication by a base station is disclosed. The method includes transmitting a plurality of downlink transmissions to a user equipment (UE), and receiving, from the UE, at least one status bit indicating whether all of the plurality of downlink transmissions have been successfully decoded by the UE, and selectively retransmitting one or more of the plurality of downlink transmissions based on the at least one status bit. In an aspect, the plurality of downlink transmissions may be transmitted and the at least one status bit may be received according to a semi-persistent scheduling (SPS) configuration.

In another example, a base station for wireless communication is disclosed. The base station includes at least one processor, a transceiver communicatively coupled to the at least one processor, and a memory communicatively coupled to the at least one processor. The at least one processor may be configured to transmit a plurality of downlink transmissions to a user equipment (UE), and receive, from the UE, at least one status bit indicating whether all of the plurality of downlink transmissions have been successfully decoded by the UE, and selectively retransmit one or more of the plurality of downlink transmissions based on the at least one status bit.

In another example, a non-transitory computer-readable storage medium having instructions for a base station thereon may be disclosed. The instructions, when executed by a processing circuit, cause the processing circuit to transmit a plurality of downlink transmissions to a user equipment (UE), and receive, from the UE, at least one status bit indicating whether all of the plurality of downlink transmissions have been successfully decoded by the UE, and selectively retransmit one or more of the plurality of downlink transmissions based on the at least one status bit.

In a further example, a base station for wireless communication may be disclosed. The base station includes means for transmitting a plurality of downlink transmissions to a user equipment (UE), and means for receiving, from the UE, at least one status bit indicating whether all of the plurality of downlink transmissions have been successfully decoded by the UE, and means for selectively retransmitting one or more of the plurality of downlink transmissions based on the at least one status bit.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments.

For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements, end-user devices, etc. of varying sizes, shapes and constitution.

Figure 1:
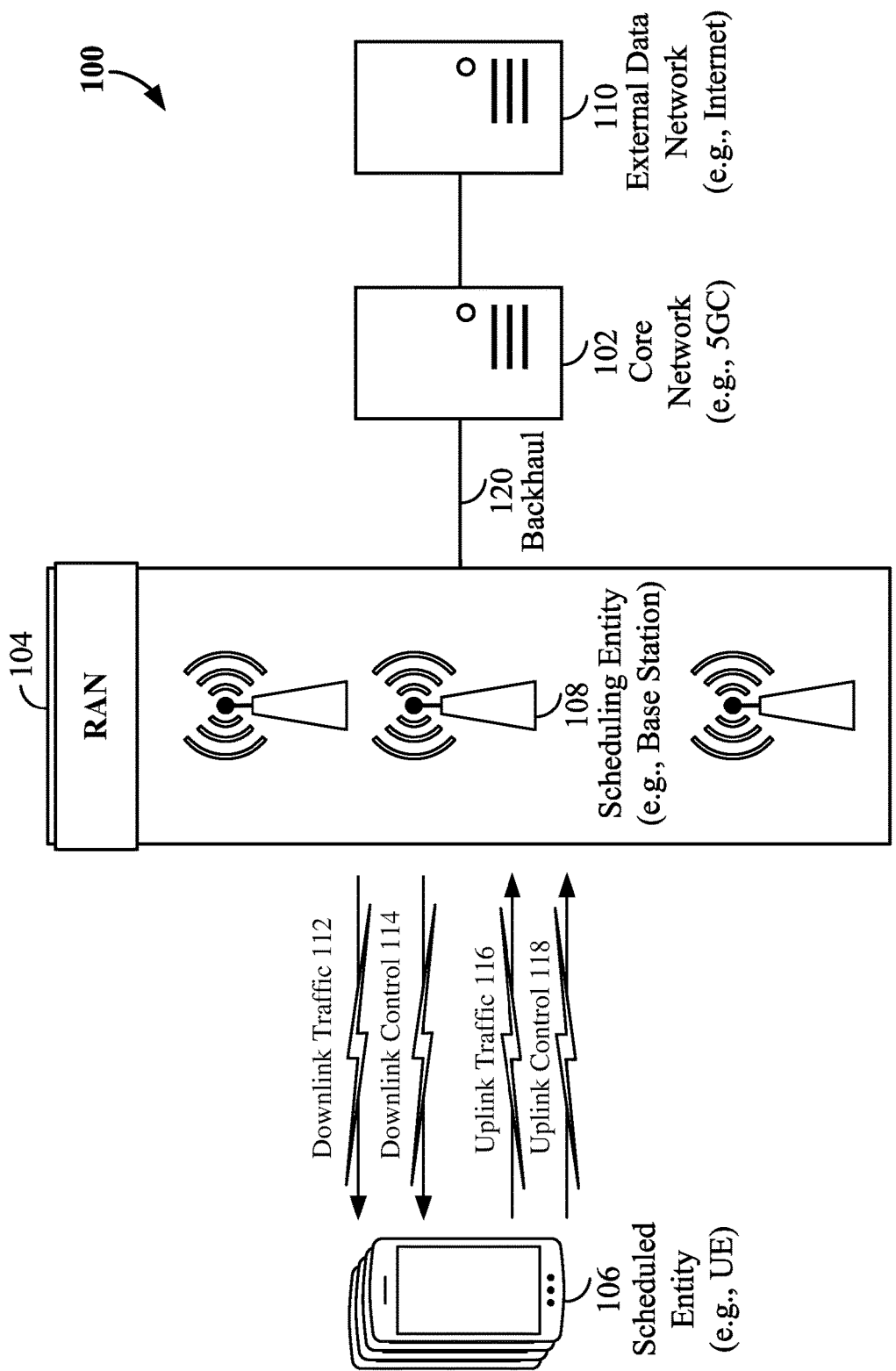
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
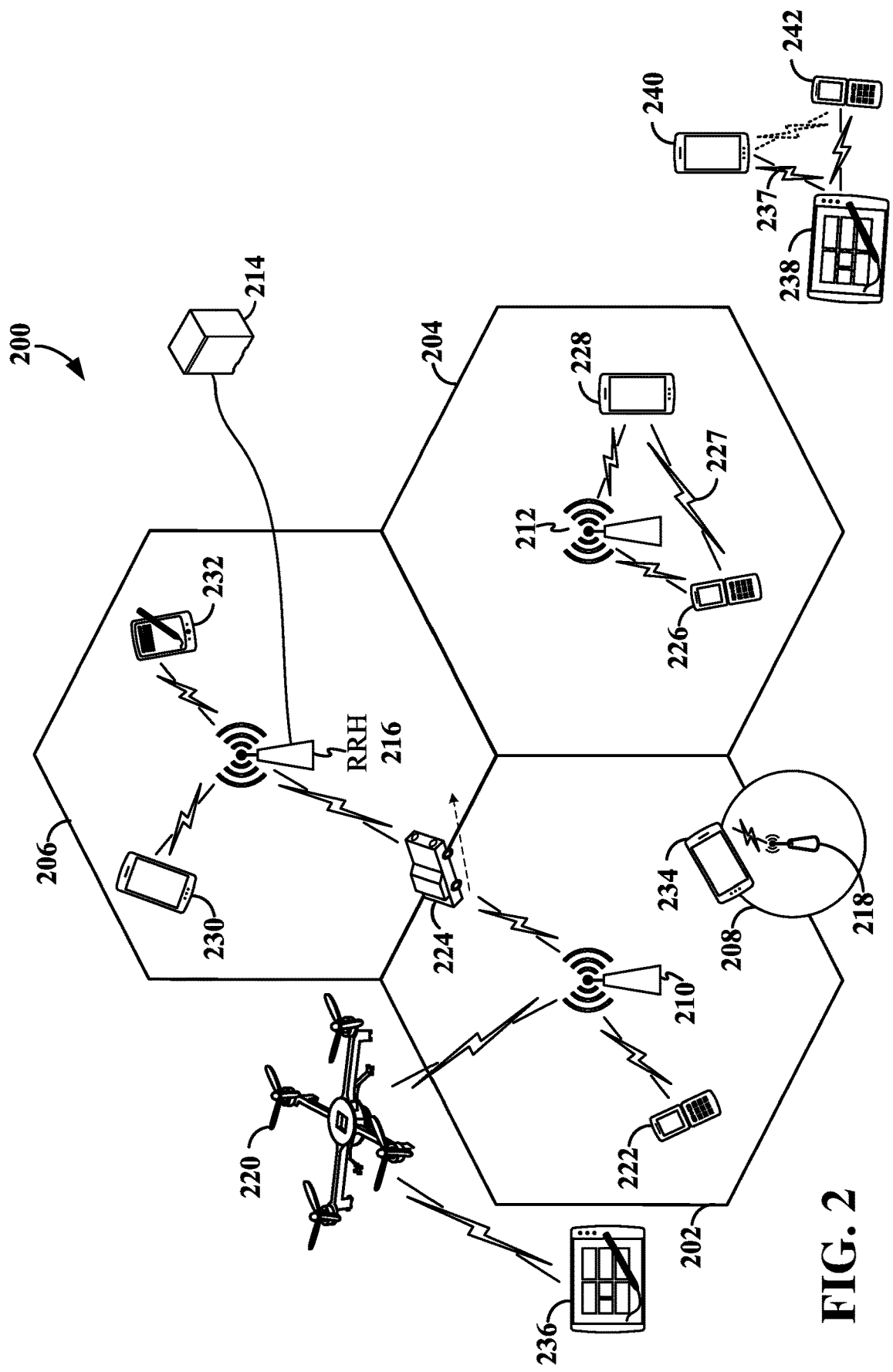
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station.

FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be quadcopter or drone 220. The UAV 220 may be configured to function as a base station, or more specifically as a mobile base station. That is, in some examples, a cell may not necessarily be stationary, and the geographic area of the cell may move according to the location of a mobile base station such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a deviceto-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
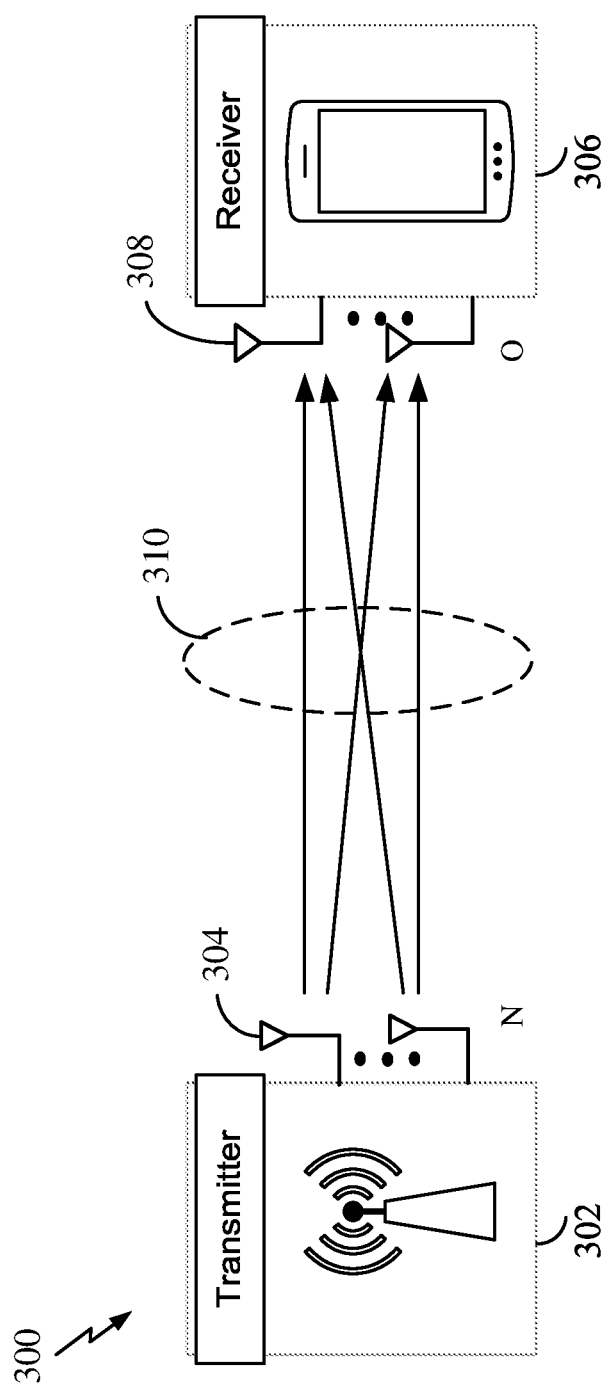
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., O receive antennas). Thus, there are N×O signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission.

In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the channel quality indicator (CQI) and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Figure 4:
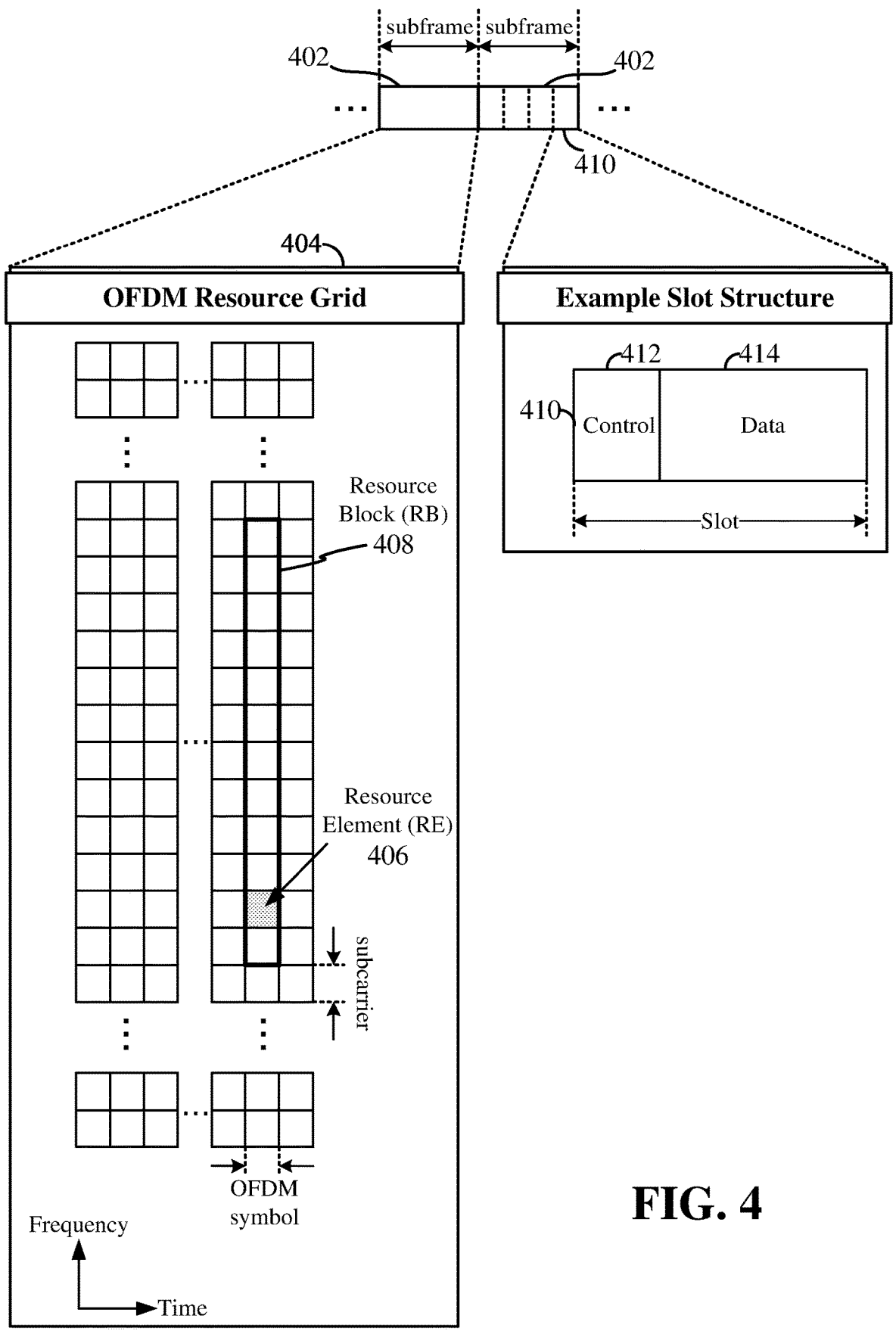
FIG. 4 is a schematic illustration of an organization of wireless resources in an air interface utilizing orthogonal frequency divisional multiplexing (OFDM) according to some aspects.

Referring now to FIG. 4, an expanded view of an exemplary subframe 402 is illustrated, showing an OFDM resource grid 404. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
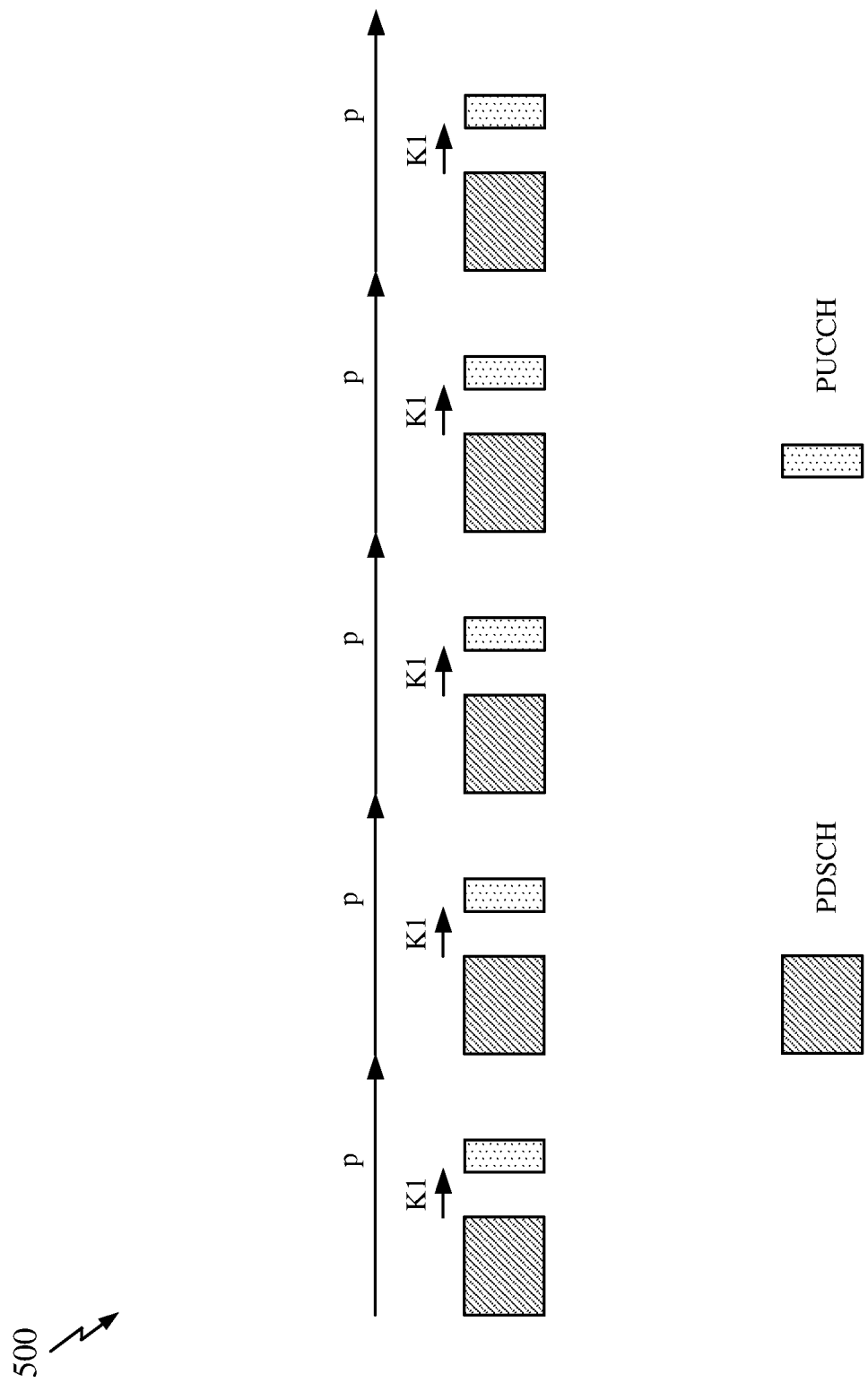
FIG. 5 is an example diagram illustrating a semi-persistent scheduling (SPS) configuration of downlink transmissions according to some aspects.

A semi-persistent scheduling (SPS) configuration of downlink transmissions (e.g., PDSCH) may be configured such that a PDSCH communication may be performed periodically with a certain periodicity. FIG. 5 is an example diagram 500 illustrating a SPS configuration of downlink transmissions according to some aspects. An SPS configuration may have different SPS occasions for PDSCH communications. The UE may receive a PDSCH signal during a downlink slot, and may transmit acknowledgement information or acknowledgement data (e.g., HARQ feedback) in a PUCCH during an uplink slot. In particular, after the UE receives the PDSCH signal, the UE may transmit HARQ feedback in a PUCCH to indicate whether the PDSCH signal has been received successfully. A PUCCH grant at time K1, specified in terms of numbers of slots from the reception of the PDSCH, may be provided for the transmission of the HARQ feedback. The HARQ feedback may include, for example, either an ACK or a NACK. Further, a time between two successive PDSCH occasions, designated as p, may be determined from the SPS configuration. Thus the PDSCH may be communicated periodically with a periodicity p based on the SPS configuration.

Figure 6:
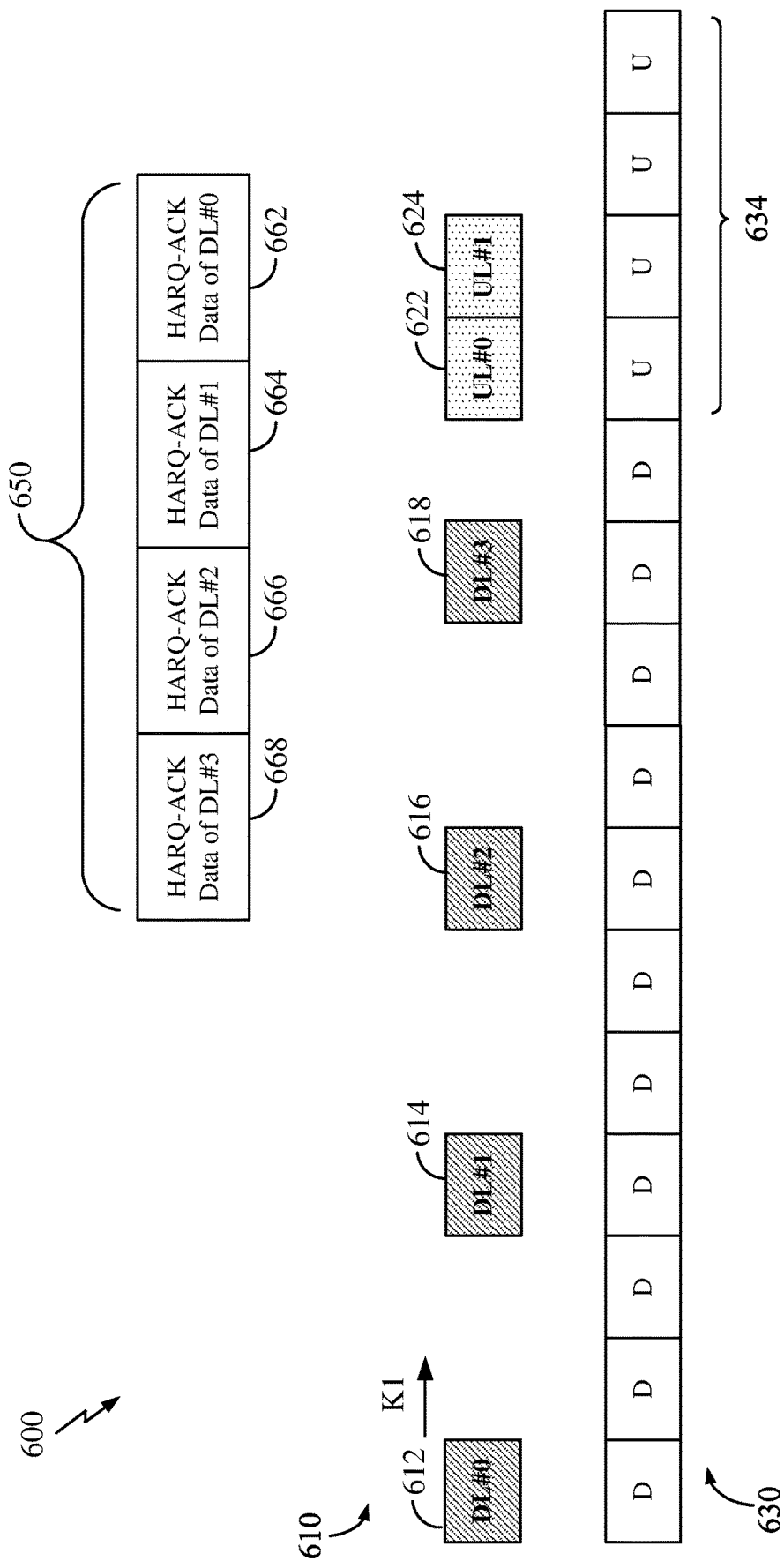
FIG. 6 is an example diagram illustrating multiple acknowledgement data being deferred to later uplink slots according to some aspects.

In some cases, the PUCCH grant time K1 may collide with a DL slot in a TDD slot structure configuration. In such cases, the UE may buffer (defer) the acknowledgement data for the PDSCH until the next available UL slot. In some examples, multiple PDSCH transmissions may be received by the UE before the next available UL slot, and the acknowledgement data for the multiple PDSCH transmissions may be deferred to the next available UL slot(s). FIG. 6 is an example diagram 600 illustrating multiple acknowledgement data being deferred to later uplink slots. In FIG. 6, communications 610 between a UE and a base station may be performed according to a TDD configuration 630. For example, in FIG. 6, downlink transmissions 612, 614, 616, and 618 according to an SPS configuration may be performed using the downlink slots in the TDD configuration 630. In FIG. 6, for each of the downlink transmissions 612, 614, 616, and 618, the TDD configuration 630 does not provide UL slots after a PUCCH grant time K1 for the transmission of respective acknowledgement data for each of the downlink transmissions 612, 614, 616, and 618. Thus, transmissions of four acknowledgement data 662, 664, 666, and 668 respectively associated with the downlink transmissions 612, 614, 616, and 618 may be deferred until UL slots are available according to the TDD configuration 630, e.g., by storing the four acknowledgement data 662, 664, 666, and 668 in a temporary storage device/space of the UE, such as a buffer 650. Hence, when the TDD configuration 630 provides UL slots 634, the four acknowledgement data 662, 664, 666, and 668 respectively associated with the downlink transmissions 612, 614, 616, and 618 may be transmitted using one or more of the UL slots 634. In the example diagram 600 of FIG. 6, uplink transmissions 622 and 624 may be performed using two of the UL slots 634 to transmit the four acknowledgement data.

For SPS, a certain success rate (e.g., percentage of ACKs) for SPS PDSCH communication may be targeted with regard to gNB link adaption, power control, rate adaption, etc. For example, an SPS PDSCH success rate for enhanced mobile broadband (eMBB) is typically around 90%, and an SPS PDSCH success rate for ultra-reliable low-latency communication (URLLC) is typically around 99.999%. Hence, the SPS PDSCH success rate may generally be high (e.g., around 90% or higher). Due to the high SPS PDSCH success rate, the acknowledgement data transmitted by a UE may include an ACK for most of the time, instead of a NACK. If the UE does not transmit the acknowledgement data for every ACK occasion, then power saving may be improved. Further, if less transmissions of the acknowledgement data are performed by multiples UEs to a base station, interference due to transmissions by multiple UEs may be reduced and/or resources may be conserved.

One approach to achieve the improved power saving and the interference reduction may be to transmit only acknowledgement data indicating a NACK to the base station, while not transmitting acknowledgement data indicating an ACK. In response to an SPS PDSCH transmission, if the base station does not receive acknowledgement data indicating a NACK, then the base station may assume that a PDSCH for the SPS PDSCH transmission has been decoded successfully, e.g., even if the base station does not receive an ACK. However, there may be situations where acknowledgement data indicating a NACK is not successfully received by the base station. For example, if an uplink channel from the UE to the base station is broken due to situations such as deep fading, severe interference, physical blocking in higher frequency bands utilizing directional beamforming, etc., the acknowledgement information with a NACK may not be successfully received by the base station. If the base station fails to receive the acknowledgement information with the NACK, e.g., due to one or more of the situations described above, the base station may incorrectly determine that a PDSCH in the SPS PDSCH transmission has been decoded successfully.

According to some aspects of the disclosure, a UE may transmit a status bit to a base station based on multiple acknowledgement data, where the status bit may indicate whether all of multiple downlink transmissions have been successfully decoded (e.g., in an SPS configuration) by the UE. The UE may be a UE or a scheduled entity as illustrated in any one or more of FIGS. 1, 2, and/or 3, and the base station may be a base station (e.g., eNB or gNB) or a scheduling entity as illustrated in any one or more of FIGS. 1, 2, and/or 3. For example, the status bit may indicate one value (e.g., 1) if all of the multiple downlink transmissions have been successfully decoded by the UE, and may indicate another value (e.g., 0) if one or more of the multiple downlink transmissions has not been successfully decoded. The status bit may include a single bit, and thus may reduce the number of resources utilized for transmission of acknowledgement data. In an example, the downlink transmissions may be PDSCH SPS communications.

When a base station transmits the multiple downlink transmissions, the UE may receive the multiple downlink transmissions and attempt to decode the multiple downlink transmissions. If a downlink transmission is successfully decoded, the UE may determine that such a downlink transmission has been successfully decoded and therefore generate an acknowledgement data indicating an ACK. On the other hand, if a downlink transmission cannot be successfully decoded (e.g., due to flaws in integrity of the downlink transmission), the UE may determine that such a downlink transmission has not been successfully decoded and therefore generate an acknowledgement data indicating a NACK. As downlink transmissions are received, the UE may generate acknowledgement data for each downlink transmission based on whether a respective downlink transmission is successfully decoded or not. The status bit may be determined based on multiple acknowledgement data respectively corresponding to the multiple downlink transmissions, depending on whether all of the multiple acknowledgement data indicates an ACK and/or whether all of the multiple downlink transmissions have been successfully decoded.

In an aspect, the UE may store the multiple acknowledgement data in a storage device (e.g., in a temporary storage device/space such as a buffer). In an aspect, the UE may store the status bit in a storage device such as a buffer. As such, the transmissions of the multiple acknowledgement data and/or the status bit may be deferred. In an aspect, the deferred transmissions of the multiple acknowledgement data and/or the status bit may be performed using one or more first available UL slots or triggered codebook type 3.

In an aspect, if the status bit generated based on multiple acknowledgement data associated with multiple downlink transmissions indicates that all of the multiple downlink transmissions have been successfully decoded, the UE may transmit the status bit to the base station but may not transmit any of the multiple acknowledgement data, e.g., by dropping the multiple acknowledgement data from a buffer. If the status bit indicates that at least one of the multiple downlink transmissions has not been successfully decoded, the UE may transmit the status bit and all of the multiple acknowledgement data to the base station. As such, the base station may determine based on the status bit whether all of the multiple downlink transmissions have been successfully decoded by the UE, instead of making an assumption based on absence of acknowledgement data indicating a NACK. Further, when at least one downlink transmission is not successfully decoded, the base station may be provided with acknowledgement data such that the base station may determine which downlink transmission has not been successfully decoded by the UE.

In an aspect, the status bit and the multiple acknowledgement data may be transmitted using a same number of RBs. As such, transmit power between the transmission of the status bit and the transmission of acknowledgement data may be aligned, and thus there may be little or no impact on power control. Further, after decoding the status bit, the base station may use the status bit as an additional DMRS to enhance channel estimation for HARQ-ACK feedback. In this aspect, because the transmit power is aligned between the transmission of the status bit and the transmission of acknowledgement data, phase coherence may be maintained between the two transmissions.

In an aspect, when the base station receives the status bit, the base station may selectively retransmit one or more of the multiple downlink transmissions based on the status bit. In particular, the base station may determine whether to retransmit one or more of the multiple downlink transmissions based on the status bit. For example, if the status bit indicates that all of the multiple downlink transmissions have been successfully decoded, the base station may determine not to retransmit any of the multiple downlink transmissions. If the status bit indicates that at least one of the multiple downlink transmissions has not been successfully decoded, then the base station may retransmit one or more of the multiple downlink transmissions, which may be based on multiple acknowledgement data received along with the status bit.

According to one approach, the UE may group multiple acknowledgement data into one or more sets of acknowledgement data. When there are multiple sets of acknowledgement data, multiple status bits are generated respectively for the multiple sets of acknowledgement data, where each status bit is for a corresponding set of acknowledgement data and indicates whether all of the downlink transmissions within the corresponding set of acknowledgement data are successfully decoded. The UE may generate and transmit a status bit for each set of acknowledgement data. A size of each set of acknowledgement data may have a data set size L. For example, if the data set size L corresponds to two acknowledgement data (e.g., two ACK/NACK bits), each set may include two acknowledgement data (e.g., two ACK/NACK bits, each indicating an ACK or NACK for a respective one of the multiple downlink transmissions). The data set size L for an acknowledgement data set may be configurable and received from the base station. Hence, for example, one status bit may be generated for every L packets (e.g., every L downlink transmissions) based on a corresponding set of acknowledgement data within L packets.

In an aspect, the UE may determine whether a respective status bit corresponding to a particular set of acknowledgement data indicates whether all of one or more downlink transmissions within the particular set of acknowledgement data have been successfully decoded. If the respective status bit indicates that all of the one or more downlink transmissions within the particular set of acknowledgement data have been successfully decoded, the UE may not transmit any of the acknowledgement data within the particular set, and may only transmit the respective status bit corresponding to the particular set. On the other hand, if the respective status bit indicates that at least one of the one or more downlink transmissions within the particular set of acknowledgement data has not been successfully decoded, the UE may transmit all of the acknowledgement data within the particular set, along with the status bit corresponding to the particular set.

Figure 7:
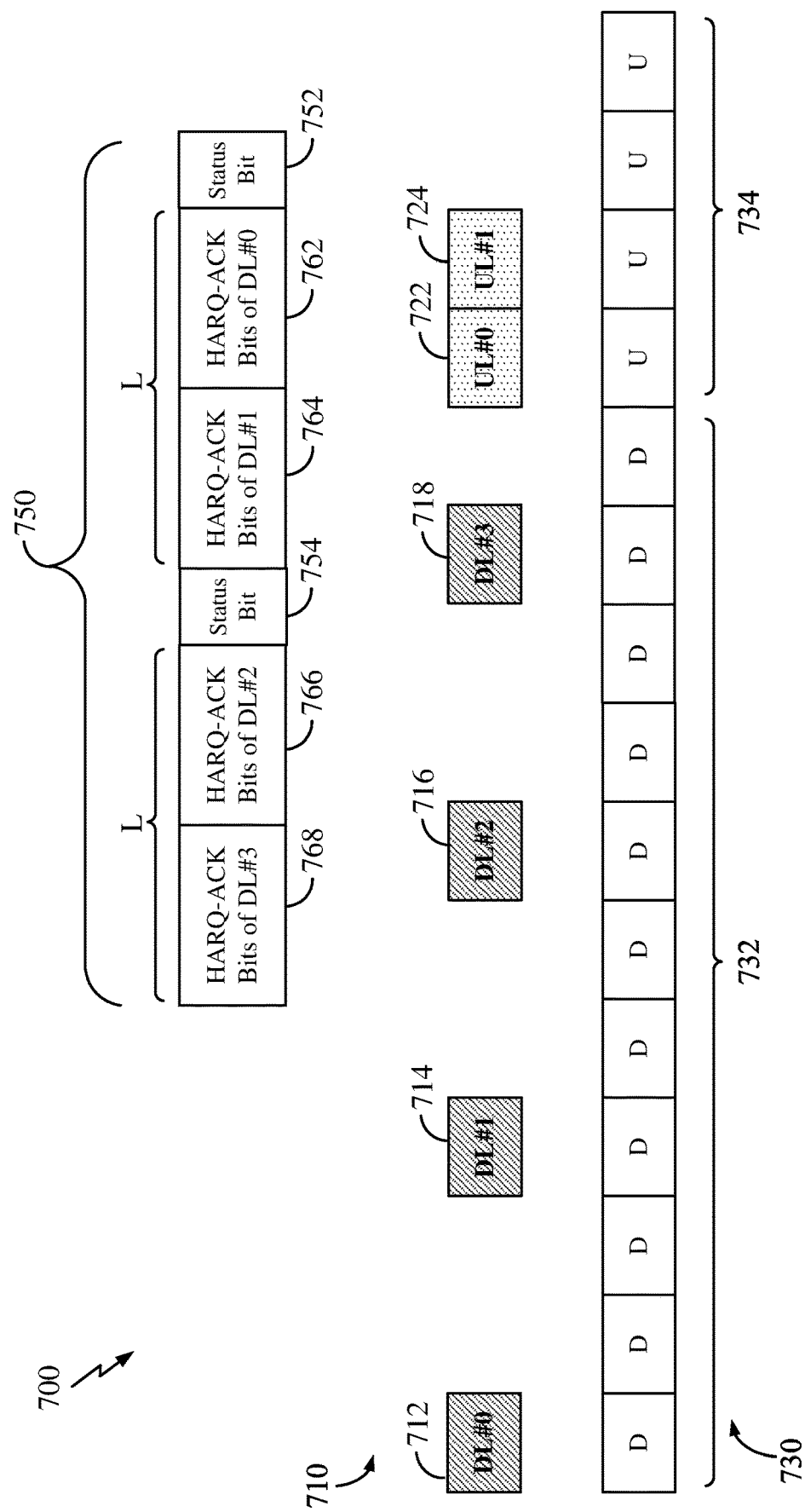
FIG. 7 is an example diagram illustrating transmissions of status bits, according to some aspects.

FIG. 7 is an example diagram 700 illustrating transmissions of status bits, according to some aspects. In FIG. 7, communications 710 between a UE and a base station may be performed according to a TDD configuration 730. For example, in FIG. 7, downlink transmissions 712, 714, 716, and 718 according to an SPS configuration may be performed using the downlink slots in the TDD configuration 730. In FIG. 7, according to the TDD configuration 730, the UL slots 734 are available after a number of DL slots 732. Four acknowledgement data 762, 764, 766, and 768 respectively associated with the downlink transmissions 712, 714, 716, and 718 are generated and stored in a storage device (e.g., a temporary storage device/space such as a buffer) 750. Each of the acknowledgement data 762, 764, 766, and 768 indicates either an ACK or a NACK, depending on whether a respective downlink transmission has been successfully decoded by the UE.

In the example shown in FIG. 7, the acknowledgement data is grouped into sets of acknowledgement data with a data set size of L packets. Here, the acknowledgement data 762, 764, 766, and 768 are grouped into sets of two acknowledgement data (e.g., L is equal to two). Therefore, a first set of acknowledgement data includes acknowledgement data 762 and 764, and the UE generates a first status bit 752 for the first set based on the acknowledgement data 762 and 764. In particular, in FIG. 7, the first status bit 752 may indicate whether all of the downlink transmissions 712 and 714 associated with the acknowledgement data 762 and 764 in the first set are successfully decoded at the UE. If the first status bit 752 indicates that all of the downlink transmissions 712 and 714 associated with the acknowledgement data 762 and 764 have been successfully decoded, the UE may transmit the first status bit 752 without transmitting the acknowledgement data 762 and 764. If the first status bit 752 indicates that at least one of the downlink transmissions 712 and 714 associated with the acknowledgement data 762 and 764 has not been successfully decoded, then the UE may transmit the acknowledgement data 762 and 764 to the base station along with the first status bit 752, e.g., by a first uplink communication 722 using one of the UL slots 734. For example, the first status bit 752 may be determined based on whether all of the acknowledgement data 762 and 764 in the first set indicates an ACK or not.

Similarly, a second set of acknowledgement data includes acknowledgement data 766 and 768, and the UE generates a second status bit 754 for the second set based on the acknowledgement data 772 and 774. If the second status bit 754 indicates that all of the downlink transmissions 716 and 718 associated with the acknowledgement data 766 and 768 have been successfully decoded, the UE may transmit the second status bit 754 without transmitting the acknowledgement data 766 and 768. If the second status bit 754 indicates that at least one of the downlink transmissions 712 and 714 associated with the acknowledgement data 766 and 768 has not been successfully decoded, then the UE may transmit the acknowledgement data 766 and 768 to the base station along with the second status bit 754, e.g., by a second uplink communication 724 using another one of the UL slots 734.

Figure 8:
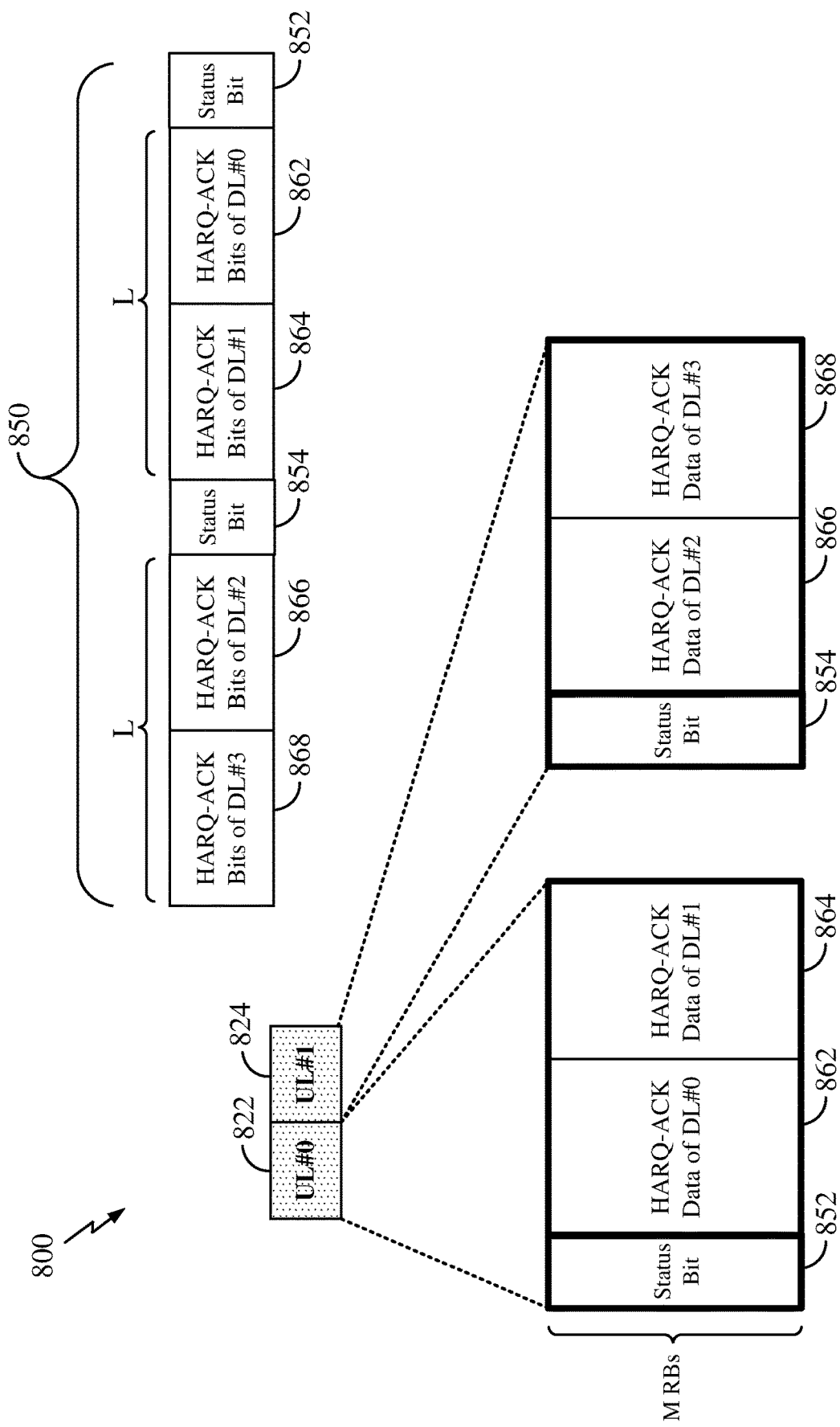
FIG. 8 is an example diagram illustrating transmission of a status bit and acknowledgement data, according to some aspects.

In an aspect, for each set of acknowledgement data, the UE may transmit a respective status bit and the acknowledgement data for a corresponding set within a same UL slot. FIG. 8 is an example diagram 800 illustrating transmission of a status bit and acknowledgement data, according to some aspects. In FIG. 8, a buffer 850 includes a first set of acknowledgement data including acknowledgement data 862 and 864, and a first status bit 852 for the first set determined based on the acknowledgement data 862 and 864. As illustrated in FIG. 8, the first status bit 852 and the acknowledgement data 862 and 864 are transmitted using the same M RBs, where M is an integer number greater than 0. The buffer 850 includes a second set of acknowledgement data including acknowledgement data 866 and 868, and a second status bit 854 for the second set determined based on the acknowledgement data 866 and 868. In an aspect, the buffer 850 may correspond to the buffer 750 of FIG. 7.

In the example of FIG. 8, the first status bit 852 indicates that at least one of the downlink transmissions associated with the acknowledgement data 862 and 864 has not been successfully decoded. Hence, in FIG. 8, first UL communication 822 using one UL slot may include transmissions of the first status bit 852 and may further include the first set of acknowledgement data including the acknowledgement data 862 and 864, within the same UL slot. On the other hand, if the first status bit 852 indicates that all of the downlink transmissions associated with the acknowledgement data 862 and 864 have been successfully decoded, then the first UL communication 822 may include only a transmission of the first status bit 852 and may not include transmissions of the acknowledgement data 862 and 864. Further, in the example of FIG. 8, the second status bit 854 indicates that at least one of the downlink transmissions associated with the acknowledgement data 866 and 868 has not been successfully decoded. Hence, second UL communication 824 using another UL slot may include transmissions of the second status bit 854 and may further include the second set of acknowledgement data including the acknowledgement data 866 and 868, within the same UL slot. On the other hand, if the second status bit 854 indicates that all of the downlink transmissions associated with the acknowledgement data 866 and 868 have been successfully decoded, then the second UL communication 824 may include only a transmission of the second status bit 854 and may not include transmissions of the acknowledgement data 866 and 868.

In an aspect, the UE may transmit the status bit in 1 or 2 OFDM symbols. Further, the status bit may be transmitted with M number of RBs. For example, M may be determined based on a data set size L, a code rate configured in a radio resource control (RRC) configuration, and/or a number of remaining symbols for a given uplink (e.g., PUCCH) allocation. The base station may provide the data set size L to the UE. For example, the base station may provide the data set size L to the UE via an RRC message (L3 signaling), a MAC-CE (L2 signaling), and/or DCI (L1 signaling).

According to another approach, the UE may generate and transmit a single status bit for all of the multiple acknowledgement data, e.g., in an SPS configuration. For example, when the UE receives multiple downlink transmissions, the multiple acknowledgement data may be generated respectively based on the multiple downlink transmissions, and a single status bit may be generated based on all of the multiple acknowledgement data. Thus, in this approach, instead of using multiple status bits respectively for multiple sets of acknowledgement data for the multiple acknowledgement data, the single status bit is used for all of the multiple acknowledgement data. If the single status bit indicates that all of the downlink transmissions in the multiple downlink transmissions corresponding to the multiple acknowledgement data have been successfully decoded, the UE may transmit the single status bit, without transmitting the multiple acknowledgement data.

If the single status bit indicates that at least one downlink transmission in the multiple downlink transmissions corresponding to the multiple acknowledgement data has not been successfully decoded, the UE may transmit the single status bit and the multiple acknowledgement data using available UL slots. In some cases, the UE may transmit the single status bit but may be able to transmit a portion of the multiple acknowledgement data. For example, if a sufficient number of UL slots are not available for transmissions of the single status bit and all of the multiple acknowledgement data, the UE may transmit the single status bit and a portion of the multiple acknowledgement data using available UL slots, (e.g., instead of transmitting all of the multiple acknowledgement data).

Figure 9:
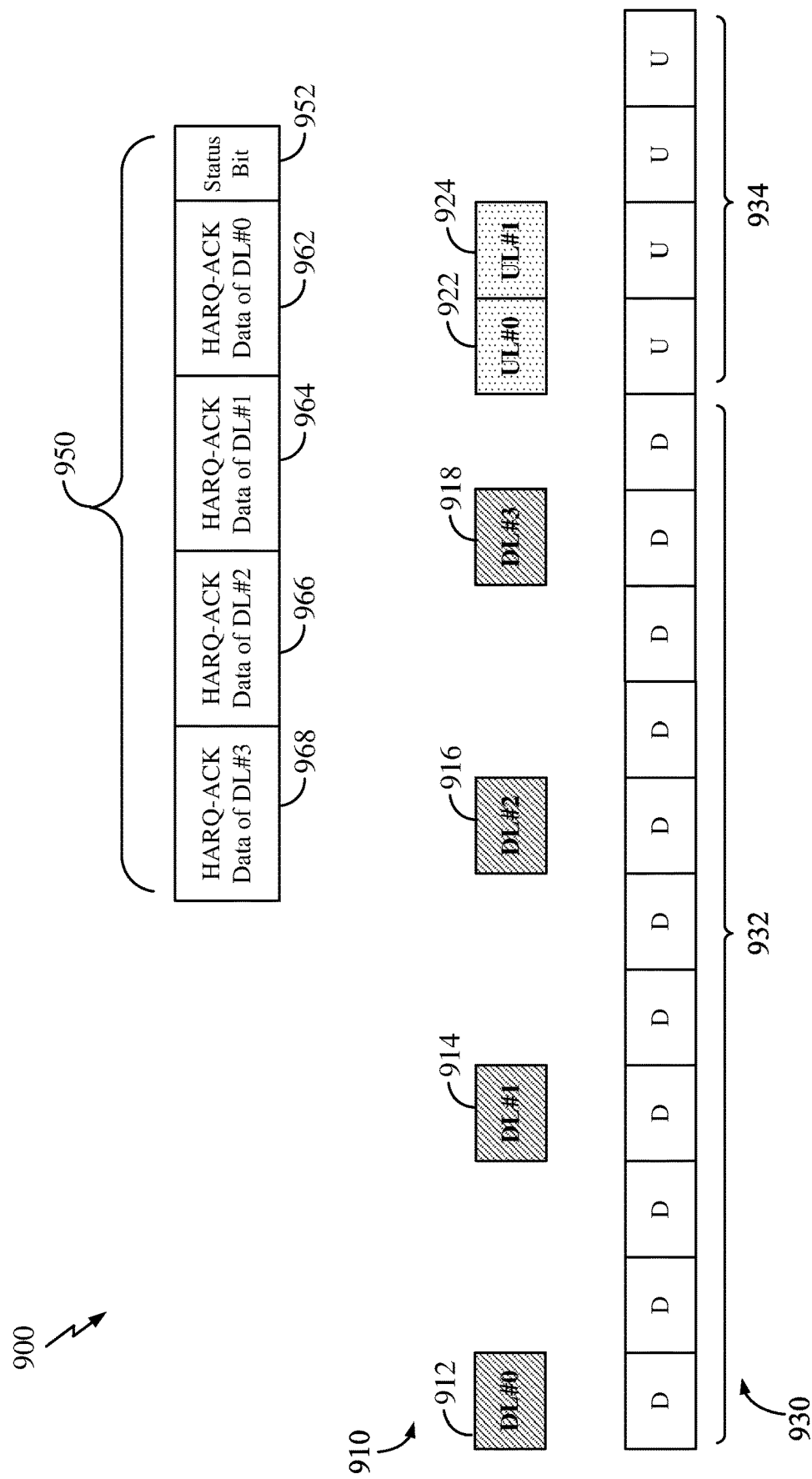
FIG. 9 is an example diagram illustrating transmissions of a status bit, according to some aspects.

FIG. 9 is an example diagram 900 illustrating transmissions of a status bit, according to some aspects. In FIG. 9, communications 910 between a UE and a base station may be performed according to a TDD configuration 930. For example, in FIG. 9, downlink transmissions 912, 914, 916, and 918 according to an SPS configuration may be performed using the downlink slots in the TDD configuration 930. In FIG. 9, according to the TDD configuration 930, the UL slots 934 are available after a number of DL slots 932. Four acknowledgement data 962, 964, 966, and 968 respectively associated with the downlink transmissions 912, 914, 916, and 918 are generated and stored in a storage device (e.g., a temporary storage device such as a buffer) 950. Each of the acknowledgement data 962, 964, 966, and 968 indicates either an ACK or a NACK, depending on whether a respective downlink transmission has been successfully decoded by the UE.

In the example shown in FIG. 9, the acknowledgement data 962, 964, 966, and 968 is not grouped into sets (e g , unlike the example shown in FIG. 7). In FIG. 9, the UE generates a status bit 952 for all of the acknowledgement data 962, 964, 966, and 968 generated respectively for the downlink transmissions 912, 914, 916, and 918 and stored, for example, in the buffer. In particular, in FIG. 9, the status bit 952 may indicate whether all of the downlink transmissions 912, 914, 916, and 918 respectively associated with the acknowledgement data 962, 964, 966, and 968 are successfully decoded. If the status bit 952 indicates that all of the downlink transmissions 912, 914, 916, and 918 respectively associated with the acknowledgement data 962, 964, 966, and 968 have been successfully decoded, the UE may transmit the status bit 952 without transmitting the acknowledgement data 962, 964, 966, and 968. If the status bit 952 indicates that at least one of the downlink transmissions 912, 914, 916, and 918 associated with the acknowledgement data 962, 964, 966, and 968 has not been successfully decoded, then the UE may transmit the acknowledgement data 962, 964, 966, and 968 to the base station along with the status bit 952, e.g., by uplink communications 922 and 924 using two of the UL slots 934. For example, the status bit 952 may be determined based on whether all of the acknowledgement data 962, 964, 966, and 968 in the SPS communication indicate an ACK or at least one of the acknowledgement data 962, 964, 966, and 968 in the SPS communication indicate a NACK.

In an aspect, the UE may transmit a single status bit and one or more of the multiple acknowledgement data used to determine the single status bit within a same UL slot, e.g., if the single status bit indicates that at least one of the downlink transmissions associated with the multiple acknowledgement data has not been successfully decoded. After transmitting the single status bit and the one or more of the multiple acknowledgement data, the UE may transmit remaining acknowledgement data of the multiple acknowledgement data using available UL slots. In some cases, if not enough UL slots to transmit the remaining acknowledgement data are available, one portion of the remaining acknowledgement data may be transmitted and another portion of the remaining acknowledgement data may be maintained in the buffer (e.g., deferred).

Figure 10:
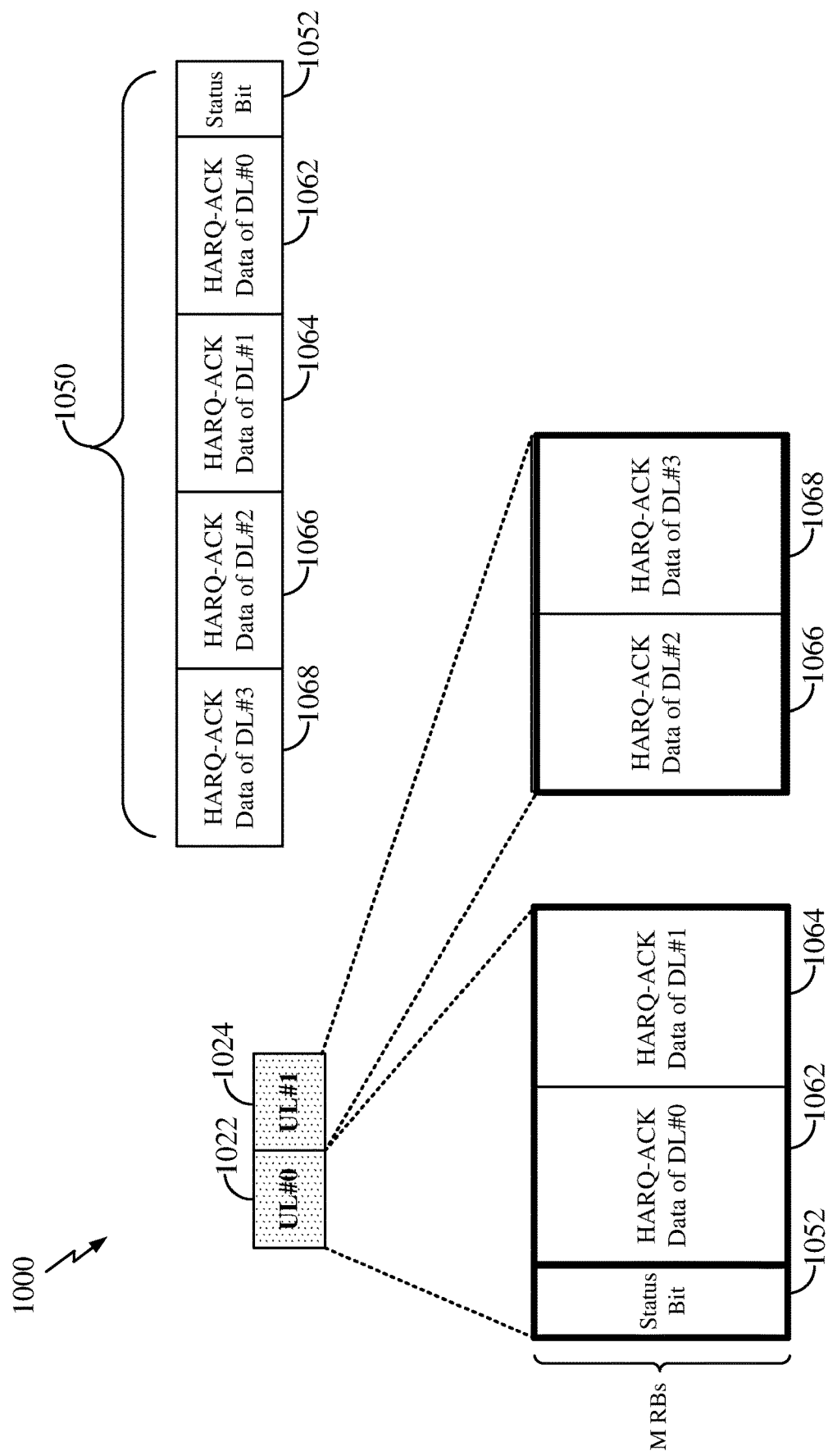
FIG. 10 is an example diagram illustrating transmission of a status bit and acknowledgement data, according to some aspects.

FIG. 10 is an example diagram 1000 illustrating transmission of a status bit and acknowledgement data, according to some aspects. In FIG. 10, a buffer 1050 includes multiple acknowledgement data 1062, 1064, 1066, and 1068, and a status bit 1052 determined based on the acknowledgement data 1062, 1064, 1066, and 1068. In an aspect, the buffer 1050 may correspond to the buffer 950 of FIG. 9. In the example of FIG. 10, the status bit 1052 indicates that at least one of the downlink transmissions associated with the multiple acknowledgement data 1062, 1064, 1066, and 1068 has not been successfully decoded, and thus the status bit 1052 and one or more of the multiple acknowledgement data 1062, 1064, 1066, and 1068 may be transmitted. In FIG. 10, first UL communication 1022 using one UL slot may include transmissions of the status bit 1052 and the acknowledgement data 1062 and 1064, within the same UL slot. As illustrated in FIG. 10, the status bit 1052 and the acknowledgement data 1062 and 1064 are transmitted using the same M RBs. Second UL communication 1024 using another UL slot may include transmissions of the remaining acknowledgement data including the acknowledgement data 1066 and 1068, within the same UL slot. On the other hand, if the status bit 1052 indicates that all of the downlink transmissions associated with the multiple acknowledgement data 1062, 1064, 1066, and 1068 have been successfully decoded, then the status bit 1052 may be transmitted, without transmitting the multiple acknowledgement data 1062, 1064, 1066, and 1068.

As discussed above, the UE may transmit the status bit (e.g., single status bit) and may also transmit at least a portion of the acknowledgement data if the status bit indicates that at least one downlink transmission in the multiple downlink transmissions corresponding to the multiple acknowledgement data has not been successfully decoded, using available UL slots. Subsequently, the UE may receive another set of downlink transmissions such as second downlink transmissions, e.g., according to the SPS configuration. Then, the UE may generate multiple second acknowledgement data respectively based on the second downlink transmissions, where each of the multiple second acknowledgement data indicates whether a respective second downlink transmission of the second downlink transmissions has been successfully decoded. Then, the UE may determine a second status bit based on the multiple second acknowledgement data, where the second status bit indicates whether all of the second downlink transmissions have been successfully decoded, and may transmit the second status bit to the base station.

If not all of the multiple acknowledgement data have been transmitted along with the status bit, the UE may determine whether to consider the remaining multiple acknowledgement data that have not been transmitted along with the status bit, for the second status bit, or to ignore this remaining multiple acknowledgement data. For example, the UE may determine the second status bit based on the remaining multiple acknowledgement data that have not been transmitted along with the status bit and/or based on the multiple second acknowledgement data. In an aspect, the UE may receive an indication from the base station that indicates whether to consider the remaining acknowledgement data of the multiple acknowledgement data that have not been transmitted along with the status bit, for determining the second status bit. In this aspect, the second status bit may be determined based on the indication. The base station may transmit the indication to the UE via one or more of an RRC message, a MAC-CE, DCI for SPS configuration activation and/or reactivation.

Figure 11:
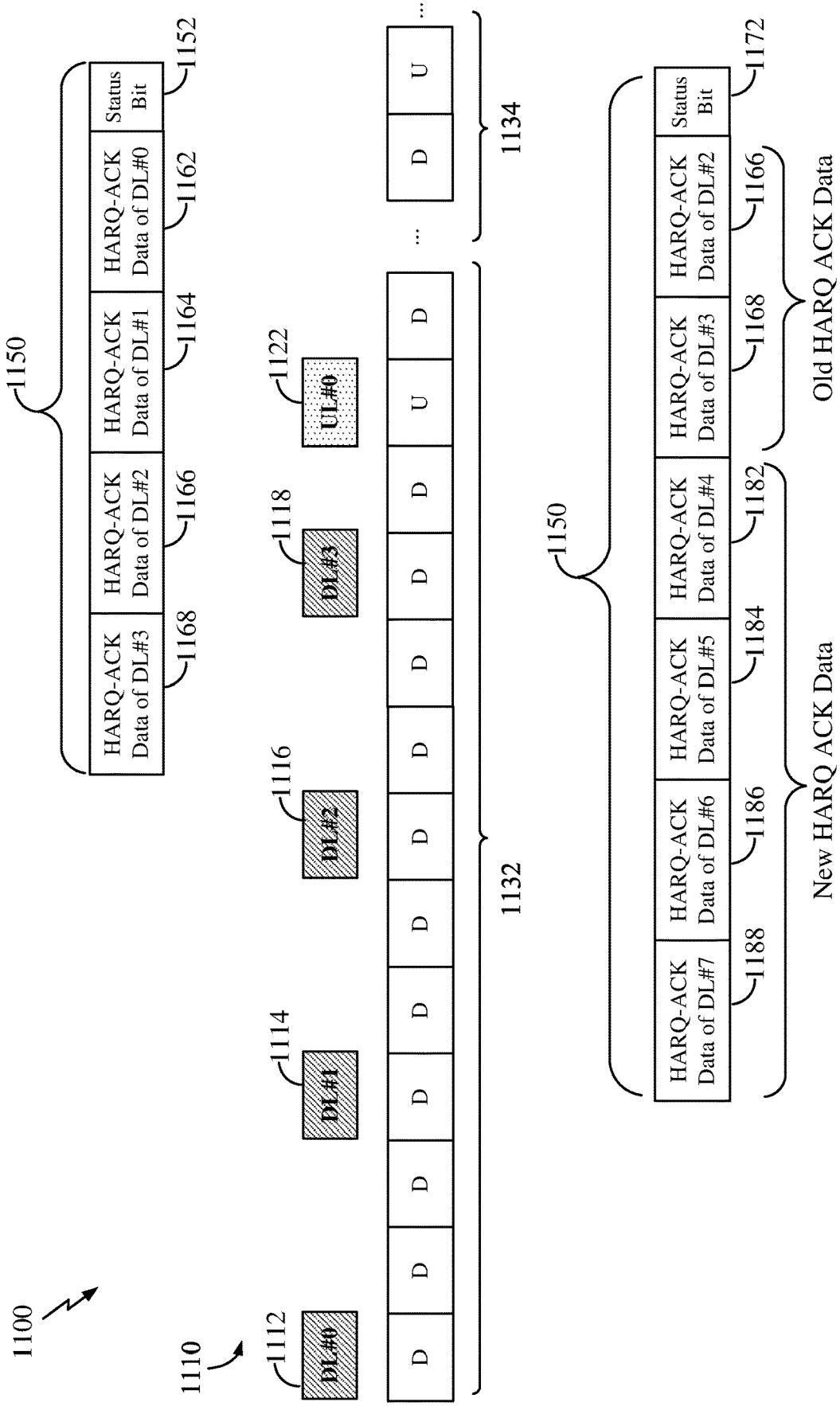
FIG. 11 is an example diagram illustrating transmissions of status bits, according to some aspects.

FIG. 11 is an example diagram 1100 illustrating transmissions of status bits, according to some aspects. In FIG. 11, communications 1110 between a UE and a base station may be performed according to a first TDD configuration 1132. For example, in FIG. 11, downlink transmissions 1112, 1114, 1116, and 1118 according to an SPS configuration may be performed using the downlink slots in the first TDD configuration 1132. In FIG. 11, according to the first TDD configuration 1132, a single UL slot is available after a number of DL slots. Four acknowledgement data 1162, 1164, 1166, and 1168 respectively associated with the downlink transmissions 1112, 1114, 1116, and 1118 are generated and stored in a storage device (e.g., a temporary storage device/space such as a buffer). Each of the acknowledgement data 1162, 1164, 1166, and 1168 indicates either an ACK or a NACK, depending on whether a respective downlink transmission has been successfully decoded by the UE.

In the example shown in FIG. 11, the acknowledgement data 1162, 1164, 1166, and 1168 are not grouped into sets. In FIG. 11, the UE generates a status bit 1152 for all of the acknowledgement data 1162, 1164, 1166, and 1168 received during the downlink transmissions 1112, 1114, 1116, and 1118. In particular, in FIG. 11, the status bit 1152 may indicate whether all of the downlink transmissions 1112, 1114, 1116, and 1118 respectively associated with the acknowledgement data 1162, 1164, 1166, and 1168 are successfully decoded. If the status bit 1152 indicates that all of the downlink transmissions 1112, 1114, 1116, and 1118 respectively associated with the acknowledgement data 1162, 1164, 1166, and 1168 have been successfully decoded, the UE may transmit the status bit 1152 without transmitting the acknowledgement data 1162, 1164, 1166, and 1168.

If the status bit 1152 indicates that at least one of the downlink transmissions 1112, 1114, 1116, and 1118 associated with the acknowledgement data 1162, 1164, 1166, and 1168 has not been successfully decoded, then the UE may attempt to transmit the acknowledgement data 1162, 1164, 1166, and 1168 to the base station along with the status bit 1152. For example, the status bit 1152 may be determined based on whether all of the acknowledgement data 1162, 1164, 1166, and 1168 in the SPS communication indicate an ACK or not. In FIG. 11, not enough UL slots are provided to transmit all of the acknowledgement data 1162, 1164, 1166, and 1168 and thus a portion of the acknowledgement data 1162, 1164, 1166, and 1168 may be transmitted. In particular, in FIG. 11, if the status bit 1152 indicates that at least one of the downlink transmissions 1112, 1114, 1116, and 1118 associated with the acknowledgement data 1162, 1164, 1166, and 1168 has not been successfully decoded, the UE may transmit the status bit 1152 and the acknowledgement data 1162 and 1164 using the UL slot in the first TDD configuration 1132, e.g., by uplink communication 1122, without transmitting the remaining acknowledgement data 1166 and 1168, e.g., because not enough UL slots are provided to transmit the remaining acknowledgement data 1166 and 1168.

In FIG. 11, the remaining acknowledgement data 1166 and 1168 that have not been transmitted are stored in a storage device (e.g., a temporary storage device/space such as a buffer) 1150 and may be considered later. After transmitting the status bit 1152 and the acknowledgement data 1162 and 1164, the UE may receive second downlink transmissions according to a second TDD configuration 1134, and may determine second acknowledgement data 1182, 1184, 1186, and 1188 respectively based on the second downlink transmissions, where the second acknowledgement data 1182, 1184, 1186, and 1188 may be stored in the storage device 1150. In FIG. 11, the UE may determine a second status bit 1172 based on the second acknowledgement data 1182, 1184, 1186, and 1188 as well as the remaining acknowledgement data 1166 and 1168, and may store the second status bit 1172 in the storage device 1150. Hence, in FIG. 11, if the second status bit 1172 indicates that every downlink transmission corresponding to the second downlink transmissions and the downlink transmissions 1116 and 1118 corresponding to the remaining acknowledgement data 1166 and 1168 has been successfully decoded by the UE, the UE may transmit the second status bit 1172 without transmitting the second acknowledgement data 1182, 1184, 1186, and 1188, and without transmitting the remaining acknowledgement data 1166 and 1168. On the other hand, if the second status bit 1172 indicates that at least one downlink transmission corresponding to the second downlink transmissions and the downlink transmissions 1116 and 1118 corresponding to the remaining acknowledgement data 1166 and 1168 has not been successfully decoded by the UE, the UE may attempt to transmit the second status bit 1172 and the second acknowledgement data 1182, 1184, 1186, and 1188, as well as the remaining acknowledgement data 1166 and 1168, using available UL slots in the second TDD configuration 1134.

Figure 12:
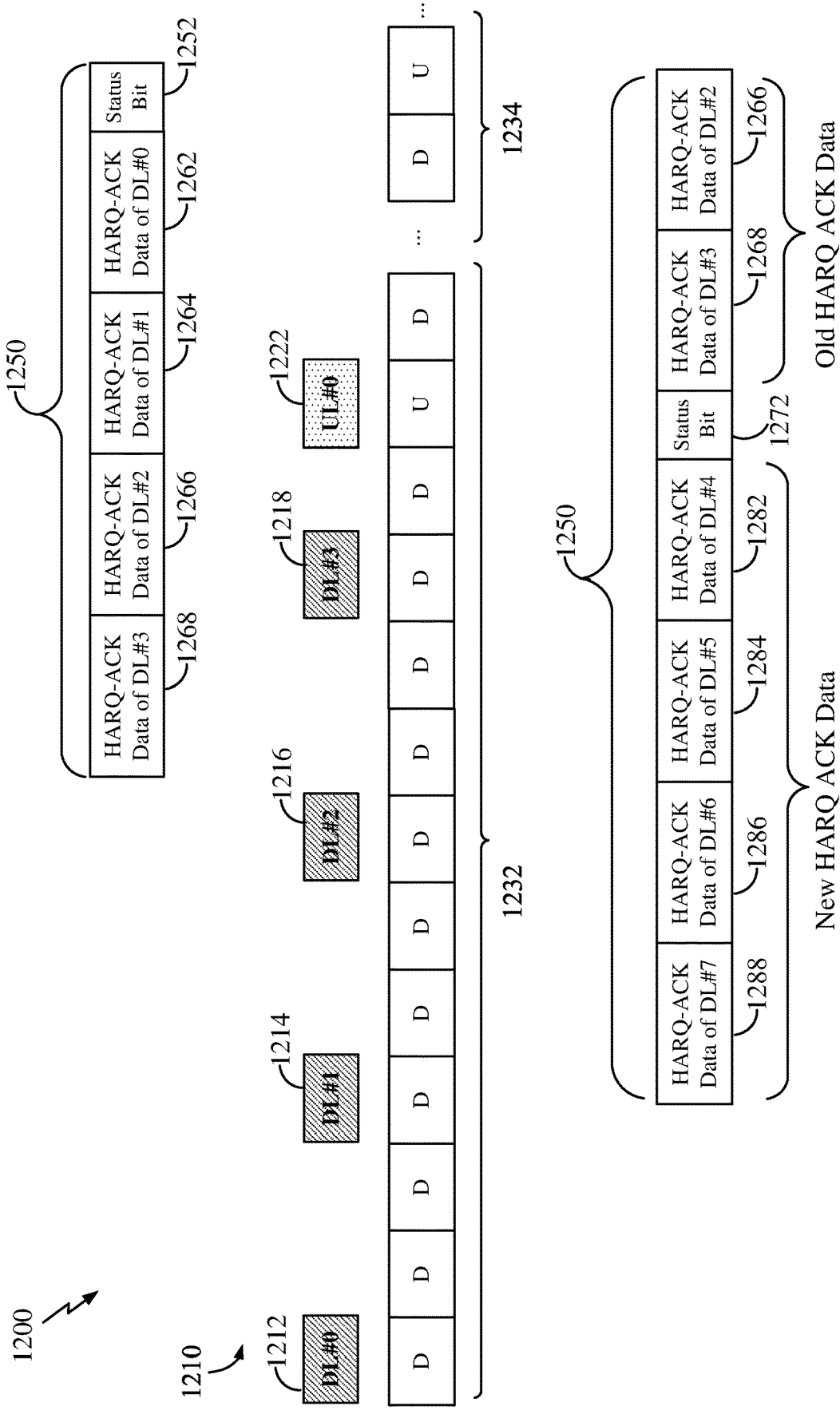
FIG. 12 is an example diagram illustrating transmissions of status bits, according to some aspects.

FIG. 12 is an example diagram 1200 illustrating transmissions of status bits, according to some aspects. In FIG. 12, communications 1210 between a UE and a base station may be performed according to a first TDD configuration 1232. For example, in FIG. 12, downlink transmissions 1212, 1214, 1216, and 1218 according to an SPS configuration may be performed using the downlink slots in the first TDD configuration 1232. In FIG. 12, according to the first TDD configuration 1232, a single UL slot is available after a number of DL slots. Four acknowledgement data 1262, 1264, 1266, and 1268 respectively associated with the downlink transmissions 1212, 1214, 1216, and 1218 are generated and stored in a storage device (e.g., a temporary storage device/space such as a buffer). Each of the acknowledgement data 1262, 1264, 1266, and 1268 indicates either an ACK or a NACK, depending on whether a respective downlink transmission has been successfully decoded by the UE.

In the example shown in FIG. 12, the acknowledgement data 1262, 1264, 1266, and 1268 is not grouped into sets. In FIG. 12, the UE generates a status bit 1252 for all of the acknowledgement data 1262, 1264, 1266, and 1268 received during the downlink transmissions 1212, 1214, 1216, and 1218. In particular, in FIG. 12, the status bit 1252 may indicate whether all of the downlink transmissions 1212, 1214, 1216, and 1218 respectively associated with the acknowledgement data 1262, 1264, 1266, and 1268 are successfully decoded. If the status bit 1252 indicates that all of the downlink transmissions 1212, 1214, 1216, and 1218 respectively associated with the acknowledgement data 1262, 1264, 1266, and 1268 have been successfully decoded, the UE may transmit the status bit 1252 without transmitting the acknowledgement data 1262, 1264, 1266, and 1268.

If the status bit 1252 indicates that at least one of the downlink transmissions 1212, 1214, 1216, and 1218 associated with the acknowledgement data 1262, 1264, 1266, and 1268 has not been successfully decoded, then the UE may attempt to transmit the acknowledgement data 1262, 1264, 1266, and 1268 to the base station along with the status bit 1252. For example, the status bit 1252 may be determined based on whether all of the acknowledgement data 1262, 1264, 1266, and 1268 in the SPS communication indicate an ACK or not. In FIG. 12, not enough UL slots are provided to transmit all of the acknowledgement data 1262, 1264, 1266, and 1268 and thus a portion of the acknowledgement data 1262, 1264, 1266, and 1268 may be transmitted. In particular, in FIG. 12, if the status bit 1252 indicates that at least one of the downlink transmissions 1212, 1214, 1216, and 1218 associated with the acknowledgement data 1262, 1264, 1266, and 1268 has not been successfully decoded, the UE may transmit the status bit 1252 and the acknowledgement data 1262 and 1264 using the UL slot in the first TDD configuration 1232, e.g., by uplink communication 1222, without transmitting the remaining acknowledgement data 1266 and 1268, e.g., because not enough UL slots are provided to transmit the remaining acknowledgement data 1266 and 1268.

In FIG. 12, the remaining acknowledgement data 1266 and 1268 that have not been transmitted may be stored in a storage device (e.g., a temporary storage device/space such as a buffer) 1250. After transmitting the status bit 1252 and the acknowledgement data 1262 and 1264, the UE may receive second downlink transmissions according to a second TDD configuration 1234, and may determine second acknowledgement data 1282, 1284, 1286, and 1288 respectively based on the second downlink transmissions, which may be stored in the storage device 1250. Unlike the example illustrated in FIG. 11, in FIG. 12, the UE may determine a second status bit 1272 based on the second acknowledgement data 1282, 1284, 1286, and 1288 without considering the remaining acknowledgement data 1266 and 1268. The UE may store the second status bit 1272 in the storage device 1250. Hence, in FIG. 12, if the second status bit 1272 indicates that every downlink transmission corresponding to the second downlink transmissions has been successfully decoded by the UE, the UE may transmit the second status bit 1272 without transmitting the second acknowledgement data 1282, 1284, 1286, and 1288. On the other hand, if the second status bit 1272 indicates that at least one downlink transmission corresponding to the second downlink transmissions has not been successfully decoded by the UE, the UE may attempt to transmit the second status bit 1272 and the second acknowledgement data 1282, 1284, 1286, and 1288, using available UL slots in the second TDD configuration 1234.

In an aspect, the base station may transmit to the UE a status bit configuration indicating whether to utilize two or more status bits or a single status bit for the multiple acknowledgement data. Based on the status bit configuration, the UE may determine to use one approach utilizing two or more status bits or another approach utilizing a single status bit, for the multiple acknowledgement data. In an aspect, the status bit configuration may further indicate not to utilize any status bit. If the status bit configuration indicates not to utilize any status bit, then no status bit is generated or transmitted by the UE. The status bit configuration may be transmitted to the UE via at least one of an RRC message, MAC-CE, or DCI.

Figure 13:
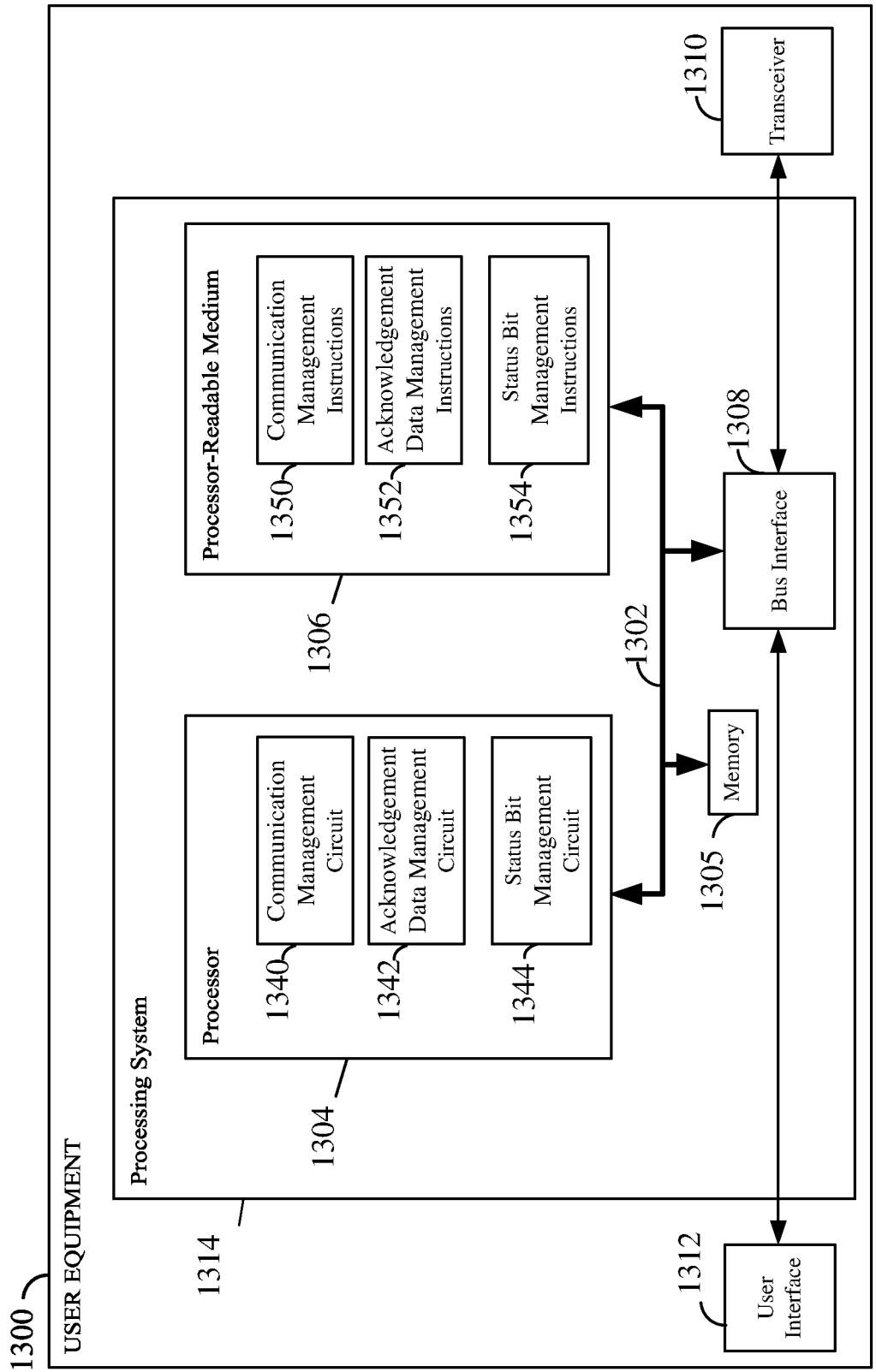
FIG. 13 is a block diagram conceptually illustrating an example of a hardware implementation for a user equipment (UE) according to some aspects of the disclosure.

FIG. 13 is a block diagram illustrating an example of a hardware implementation for a UE 1300 employing a processing system 1314. For example, the UE 1300 may be a UE as illustrated in any one or more of FIGS. 1, 2, and/or 3. In another example, the UE 1300 may be a UE or a scheduled entity as illustrated in any one or more of FIGS. 1, 2, and/or 3.

The UE 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described below and illustrated in FIGS. 14-15.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable storage medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. Depending upon the nature of the apparatus, a user interface 1312 (e.g., keypad, display, speaker, microphone, joystick) may also be provided.

The processor 1304 is responsible for managing the bus 1302 and general processing, including the execution of software stored on the computer-readable storage medium 1306. The software, when executed by the processor 1304, causes the processing system 1314 to perform the various functions described below for any particular apparatus. The computer-readable storage medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1306. The computer-readable storage medium 1306 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1306 may reside in the processing system 1314, external to the processing system 1314, or distributed across multiple entities including the processing system 1314. The computer-readable storage medium 1306 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the processor 1304 may include communication management circuitry 1340 configured for various functions, including, for example, receiving a plurality of downlink transmissions from a base station. For example, the communication management circuitry 1340 may be configured to implement one or more of the functions described below in relation to FIGS. 14-15, including, e.g., blocks 1402 and 1502. The communication management circuitry 1340 may further be configured to execute communication management software/instructions 1350 stored in the computer-readable storage medium 1306 to perform one or more of the functions described below in relation to FIGS. 14-15, including, e.g., blocks 1402 and 1502.

In some aspects, the communication management circuitry 1340 may be configured for various functions, including, for example, receiving, from a base station, a data set size of an acknowledgement data set. For example, the communication management circuitry 1340 may be configured to implement one or more of the functions described below in relation to FIG. 15, including, e.g., block 1506. The communication management circuitry 1340 may further be configured to execute communication management software/instructions 1350 stored in the computer-readable storage medium 1306 to perform one or more of the functions described below in relation to FIG. 15, including, e.g., block 1506.

In some aspects, the communication management circuitry 1340 may be configured for various functions, including, for example, determining a number of resource blocks to be used for transmitting the at least one status bit based at least on the data set size. For example, the communication management circuitry 1340 may be configured to implement one or more of the functions described below in relation to FIG. 15, including, e.g., block 1508. The communication management circuitry 1340 may further be configured to execute the communication management software/instructions 1350 stored in the computer-readable storage medium 1306 to perform one or more of the functions described below in relation to FIG. 15, including, e.g., block 1508.

In some aspects, the communication management circuitry 1340 may be configured for various functions, including, for example, receiving a status bit configuration indicating whether to utilize two or more status bits or a single status bit for the plurality of acknowledgement data. For example, the communication management circuitry 1340 may be configured to implement one or more of the functions described below in relation to FIG. 15, including, e.g., block 1512. The communication management circuitry 1340 may further be configured to execute the communication management software/instructions 1350 stored in the computer-readable storage medium 1306 to perform one or more of the functions described below in relation to FIG. 15, including, e.g., block 1512.

In some aspects, the communication management circuitry 1340 may be configured for various functions, including, for example, for each set of the one or more sets of acknowledgement data, transmitting a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded. For example, the communication management circuitry 1340 may be configured to implement one or more of the functions described below in relation to FIG. 15, including, e.g., block 1536. The communication management circuitry 1340 may further be configured to execute the communication management software/instructions 1350 stored in the computer-readable storage medium 1306 to perform one or more of the functions described below in relation to FIG. 15, including, e.g., block 1536.

In some aspects, the communication management circuitry 1340 may be configured for various functions, including, for example, for each set of the one or more sets of acknowledgement data, refraining from transmitting a respective set of the one or more sets of acknowledgement data when a respective status bit of the at least one status bit indicates that every downlink transmission in the plurality of downlink transmissions corresponding to the respective set of the one or more sets of acknowledgement data has been successfully decoded. For example, the communication management circuitry 1340 may be configured to implement one or more of the functions described below in relation to FIG. 15, including, e.g., block 1538. The communication management circuitry 1340 may further be configured to execute the communication management software/instructions 1350 stored in the computer-readable storage medium 1306 to perform one or more of the functions described below in relation to FIG. 15, including, e.g., block 1538.

In some aspects, the communication management circuitry 1340 may be configured for various functions, including, for example, transmitting at least a portion of the plurality of acknowledgement data when the single status bit indicates that at least one downlink transmission in the plurality of downlink transmissions corresponding to the plurality of acknowledgement data has not been successfully decoded. For example, the communication management circuitry 1340 may be configured to implement one or more of the functions described below in relation to FIG. 15, including, e.g., block 1540. The communication management circuitry 1340 may further be configured to execute the communication management software/instructions 1350 stored in the computer-readable storage medium 1306 to perform one or more of the functions described below in relation to FIG. 15, including, e.g., block 1540.

In some aspects, the communication management circuitry 1340 may be configured for various functions, including, for example, refraining from transmitting the plurality of acknowledgement data when the single status bit indicates that every downlink transmission in the plurality of downlink transmissions corresponding to the plurality of acknowledgement data has been successfully decoded. For example, the communication management circuitry 1340 may be configured to implement one or more of the functions described below in relation to FIG. 15, including, e.g., block 1542. The communication management circuitry 1340 may further be configured to execute the communication management software/instructions 1350 stored in the computer-readable storage medium 1306 to perform one or more of the functions described below in relation to FIG. 15, including, e.g., block 1542.

In some aspects, the communication management circuitry 1340 may be configured for various functions, including, for example, receiving a plurality of second downlink transmissions after transmitting the at least one status bit and before transmitting one or more remaining acknowledgement data of the plurality of acknowledgement data. For example, the communication management circuitry 1340 may be configured to implement one or more of the functions described below in relation to FIG. 15, including, e.g., block 1564. The communication management circuitry 1340 may further be configured to execute the communication management software/instructions 1350 stored in the computer-readable storage medium 1306 to perform one or more of the functions described below in relation to FIG. 15, including, e.g., block 1564.

In some aspects, the communication management circuitry 1340 may be configured for various functions, including, for example, receiving an indication from the base station, the indication indicating whether to consider the one or more remaining acknowledgement data of the plurality of acknowledgement data for determining the second status bit. For example, the communication management circuitry 1340 may be configured to implement one or more of the functions described below in relation to FIG. 15, including, e.g., block 1568. The communication management circuitry 1340 may further be configured to execute the communication management software/instructions 1350 stored in the computer-readable storage medium 1306 to perform one or more of the functions described below in relation to FIG. 15, including, e.g., block 1568.

In some aspects of the disclosure, the processor 1304 may include acknowledgement data management circuitry 1342 configured for various functions, including, for example, generating a plurality of acknowledgement data respectively for the plurality of downlink transmissions, each of the plurality of acknowledgement data indicating whether a respective downlink transmission of the plurality of downlink transmissions has been successfully decoded. For example, the acknowledgement data management circuitry 1342 may be configured to implement one or more of the functions described below in relation to FIGS. 14-15, including, e.g., blocks 1404 and 1504. The acknowledgement data management circuitry 1342 may further be configured to execute acknowledgement data management software/instructions 1352 stored in the computer-readable storage medium 1306 to perform one or more of the functions described below in relation to FIGS. 14-15, including, e.g., blocks 1404 and 1504.

In some aspects, the acknowledgement data management circuitry 1342 may be configured for various functions, including, for example, grouping the plurality of acknowledgement data into one or more sets of acknowledgement data. For example, the acknowledgement data management circuitry 1342 may be configured to implement one or more of the functions described below in relation to FIG. 15, including, e.g., block 1510. The acknowledgement data management circuitry 1342 may further be configured to execute the acknowledgement data management software/instructions 1352 stored in the computer-readable storage medium 1306 to perform one or more of the functions described below in relation to FIG. 15, including, e.g., block 1510.

In some aspects, the acknowledgement data management circuitry 1342 may be configured for various functions, including, for example, generating a plurality of second acknowledgement data respectively for the plurality of second downlink transmissions, each of the plurality of second acknowledgement data indicating whether a respective second downlink transmission of the plurality of second downlink transmissions has been successfully decoded. For example, the acknowledgement data management circuitry 1342 may be configured to implement one or more of the functions described below in relation to FIG. 15, including, e.g., block 1566. The acknowledgement data management circuitry 1342 may further be configured to execute the acknowledgement data management software/instructions 1352 stored in the computer-readable storage medium 1306 to perform one or more of the functions described below in relation to FIG. 15, including, e.g., block 1566.

In some aspects of the disclosure, the processor 1304 may include status bit management circuitry 1344 configured for various functions, including, for example, transmitting, to the base station, at least one status bit based on the plurality of acknowledgement data, the at least one status bit indicating whether all of the plurality of downlink transmissions have been successfully decoded. For example, the status bit management circuitry 1344 may be configured to implement one or more of the functions described below in relation to FIGS. 14-15, including, e.g., blocks 1406 and 1514. The status bit management circuitry 1344 may further be configured to execute status bit management software/instructions 1354 stored in the computer-readable storage medium 1306 to perform one or more of the functions described below in relation to FIGS. 14-15, including, e.g., blocks 1406 and 1514.

In some aspects, the status bit management circuitry 1344 may be configured for various functions, including, for example, determining whether the two or more status bits are used or the single status bit is used for the plurality of acknowledgement data. For example, the status bit management circuitry 1344 may be configured to implement one or more of the functions described below in relation to FIG. 15, including, e.g., block 1534. The status bit management circuitry 1344 may further be configured to execute the status bit management software/instructions 1354 stored in the computer-readable storage medium 1306 to perform one or more of the functions described below in relation to FIG. 15, including, e.g., block 1534.

In some aspects, the communication management circuitry 1340 and the status bit management circuitry 1344 may be configured for various functions, including, for example, transmitting, to the base station, a second status bit based on the plurality of second acknowledgement data, the second status bit indicating whether all of the plurality of second downlink transmissions have been successfully decoded. For example, the communication management circuitry 1340 and the status bit management circuitry 1344 may be configured to implement one or more of the functions described below in relation to FIG. 15, including, e.g., block 1570. The communication management circuitry 1340 and The status bit management circuitry 1344 may further be configured to execute the communication management software/instructions 1350 and the status bit management software/instructions 1354 stored in the computer-readable storage medium 1306 to perform one or more of the functions described below in relation to FIG. 15, including, e.g., block 1570.

Figure 14:
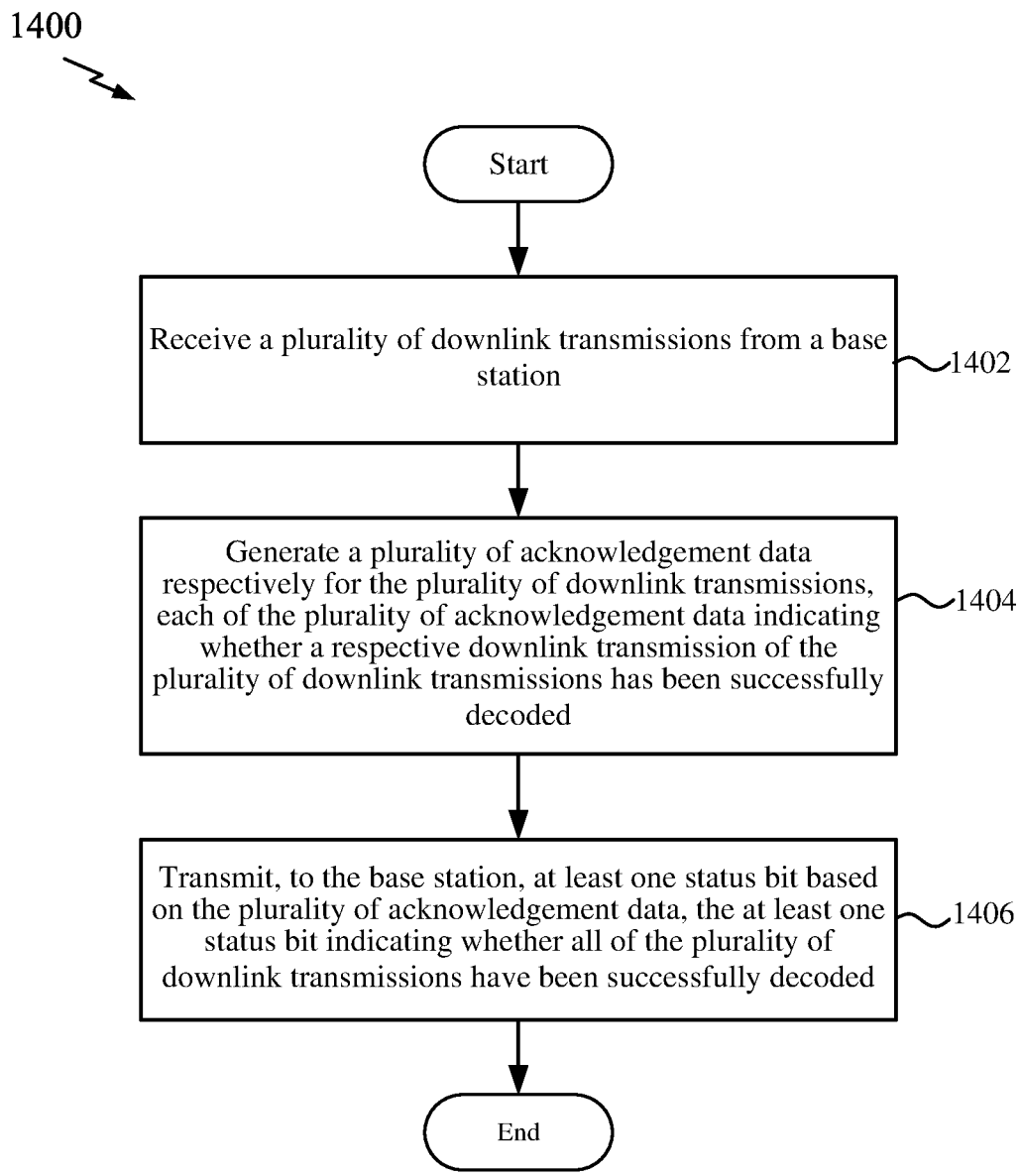
FIG. 14 is a flow chart illustrating an exemplary process for wireless communication according to some aspects of the disclosure.

FIG. 14 is a flow chart illustrating an exemplary process 1400 for wireless communication by a UE in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the UE 1300 illustrated in FIG. 13. In some examples, the process 1400 may be carried out by any suitable apparatus or means for carrying out the functions or algorithm described below.

At block 1402, the UE may receive a plurality of downlink transmissions from a base station. For example, the communication management circuitry 1340 shown and described above in connection with FIG. 13 may provide a means to receive the plurality of downlink transmissions.

At block 1404, the UE may generate a plurality of acknowledgement data respectively for the plurality of downlink transmissions, each of the plurality of acknowledgement data indicating whether a respective downlink transmission of the plurality of downlink transmissions has been successfully decoded. For example, the acknowledgement data management circuitry 1342 shown and described above in connection with FIG. 13 may provide a means to generate the plurality of acknowledgement data.

At block 1406, the UE may transmit, to the base station, at least one status bit based on the plurality of acknowledgement data, the at least one status bit indicating whether all of the plurality of downlink transmissions have been successfully decoded. For example, the status bit management circuitry 1344 shown and described above in connection with FIG. 13 may provide a means to transmitting the at least one status bit.

In one configuration, the UE 1300 for wireless communication includes means for receiving a plurality of downlink transmissions from a base station, means for generating a plurality of acknowledgement data respectively for the plurality of downlink transmissions, each of the plurality of acknowledgement data indicating whether a respective downlink transmission of the plurality of downlink transmissions has been successfully decoded, and means for transmitting, to the base station, at least one status bit based on the plurality of acknowledgement data, the at least one status bit indicating whether all of the plurality of downlink transmissions have been successfully decoded. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, and/or 3, and utilizing, for example, the processes and/or algorithms described herein in relation to FIG. 13.

Figure 15A:
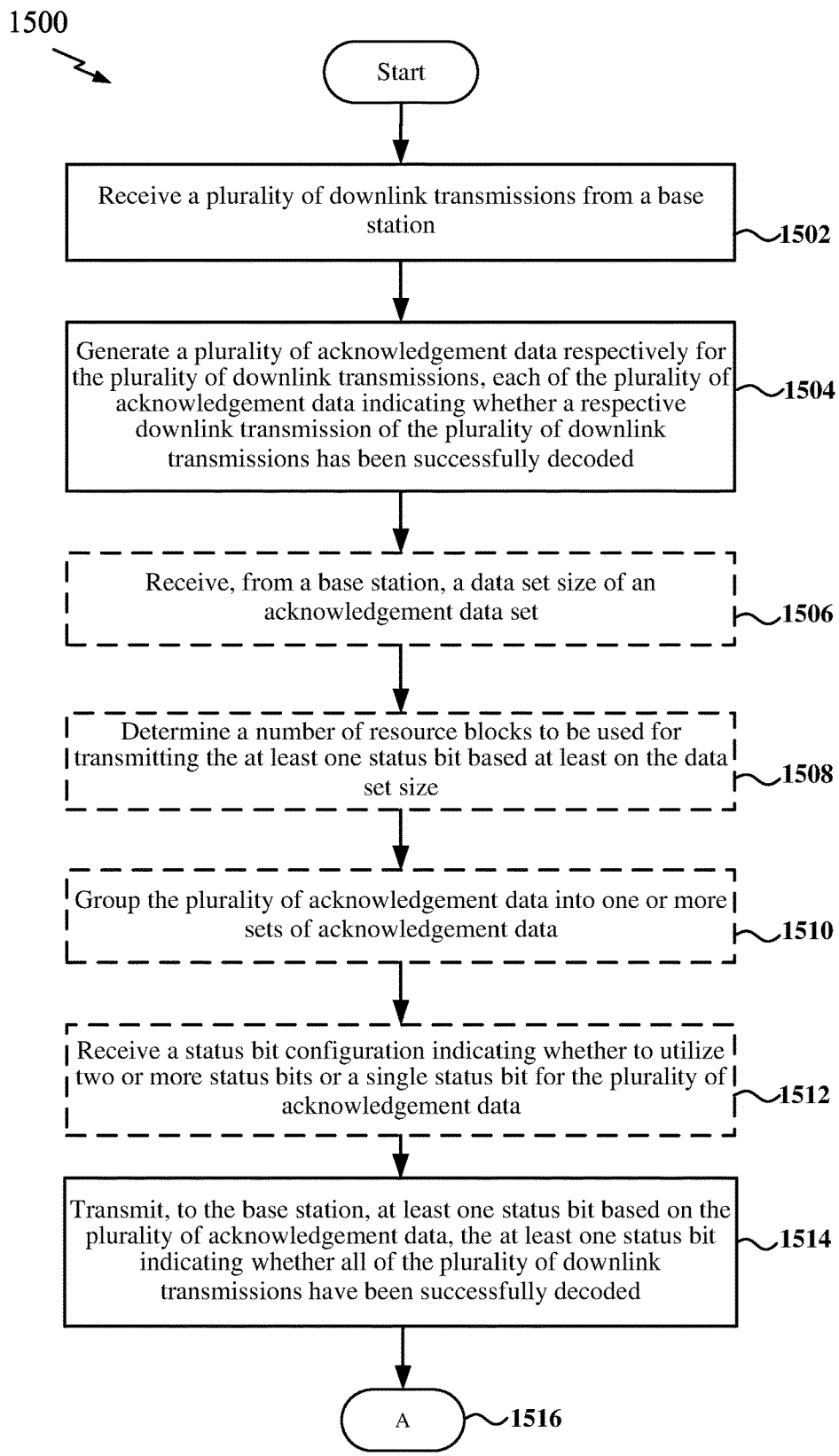
FIG. 15A is a flow chart illustrating an exemplary process for wireless communication by a UE in accordance with some aspects of the present disclosure.

FIG. 15A is a flow chart illustrating an exemplary process 1500 for wireless communication by a UE in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the UE 1300 illustrated in FIG. 13. In some examples, the process 1500 may be carried out by any suitable apparatus or means for carrying out the functions or algorithm described below.

At block 1502, the UE may receive a plurality of downlink transmissions from a base station. For example, the communication management circuitry 1340 shown and described above in connection with FIG. 13 may provide a means to receive the plurality of downlink transmissions.

At block 1504, the UE may generate a plurality of acknowledgement data respectively for the plurality of downlink transmissions, each of the plurality of acknowledgement data indicating whether a respective downlink transmission of the plurality of downlink transmissions has been successfully decoded. For example, the acknowledgement data management circuitry 1342 shown and described above in connection with FIG. 13 may provide a means to generate the plurality of acknowledgement data. In an aspect, each of the plurality of acknowledgement data indicates either an acknowledgement (ACK) that the respective downlink transmission of the plurality of downlink transmissions has been successfully decoded or a negative acknowledgement (NACK) that the respective downlink transmission has not been successfully decoded.

In an aspect, at block 1506, the UE may receive, from a base station, a data set size of an acknowledgement data set. For example, the communication management circuitry 1340 shown and described above in connection with FIG. 13 may provide a means to receive the data set size.

In an aspect, at block 1508, the UE may determine a number of resource blocks to be used for transmitting the at least one status bit based at least on the data set size. For example, the communication management circuitry 1340 shown and described above in connection with FIG. 13 may provide a means to determine the number of resource blocks.

In an aspect, at block 1510, the UE may group the plurality of acknowledgement data into one or more sets of acknowledgement data. In an aspect, a corresponding size of each set of the one or more sets of acknowledgement data may be determined based on the data set size. For example, the acknowledgement data management circuitry 1342 shown and described above in connection with FIG. 13 may provide a means to generate the plurality of acknowledgement data.

In an aspect, at block 1512, the UE may receive a status bit configuration indicating whether to utilize two or more status bits or a single status bit for the plurality of acknowledgement data. For example, the communication management circuitry 1340 shown and described above in connection with FIG. 13 may provide a means to receive the status bit configuration. In an aspect, the status bit configuration is received via at least one of an RRC message, MAC-CE, or DCI.

In an aspect, the one or more sets of acknowledgement data may include two or more sets of acknowledgement data and the at least one status bit includes two or more status bits respectively corresponding to the two or more sets of acknowledgement data, and each of the two or more status bits may indicate whether every downlink transmission in the plurality of downlink transmissions corresponding to a respective set of the two or more sets of acknowledgement data has been successfully decoded.

In an aspect, the at least one status bit may include a single status bit corresponding to the plurality of acknowledgement data, and the single status bit may indicate whether every downlink transmission in the plurality of downlink transmissions corresponding to the plurality of acknowledgement data has been successfully decoded.

At block 1514, the UE may transmit, to the base station, at least one status bit based on the plurality of acknowledgement data, the at least one status bit indicating whether all of the plurality of downlink transmissions have been successfully decoded. For example, the status bit management circuitry 1344 shown and described above in connection with FIG. 13 may provide a means to transmit the at least one status bit. In an aspect, the at least one status bit may be determined based on the status bit configuration.

In an aspect, the plurality of downlink transmissions may be received and the at least one status bit may be transmitted according to a semi-persistent scheduling (SPS) configuration.

At block 1516, the UE may continue to perform additional features, as described below.

Figure 15B:
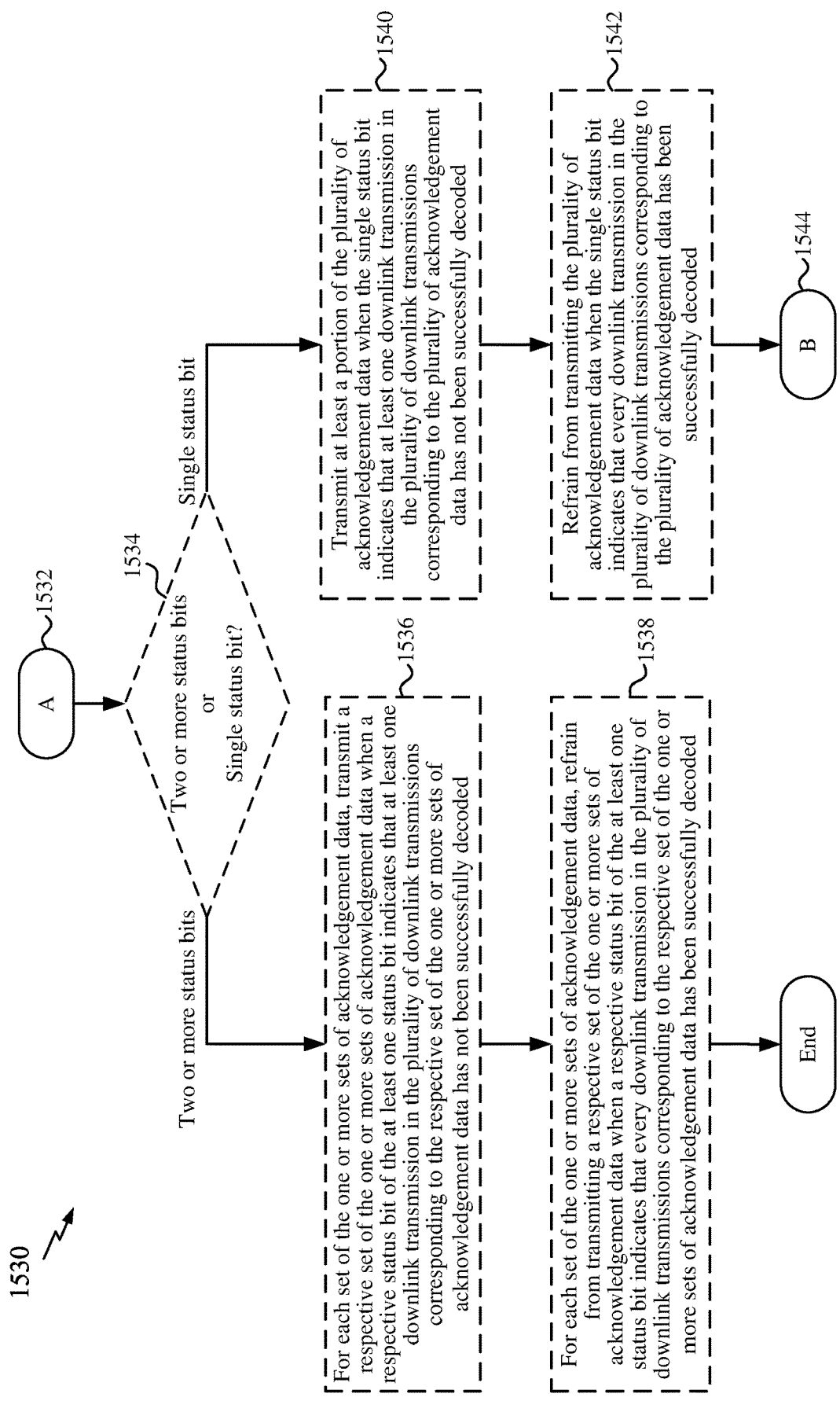
FIG. 15B is a flow chart illustrating an exemplary process for wireless communication in accordance with some aspects of the present disclosure.

FIG. 15B is a flow chart illustrating an exemplary process 1530 for wireless communication in accordance with some aspects of the present disclosure. The flow chart of FIG. 15B may be continued from the flow chart of FIG. 15A. As described below, some or all illustrated features may be omitted in a particular implementation within the scope of the present disclosure, and some illustrated features may not be required for implementation of all embodiments. In some examples, the process 1530 may be carried out by the UE 1300 illustrated in FIG. 13. In some examples, the process 1500 may be carried out by any suitable apparatus or means for carrying out the functions or algorithm described below.

At block 1532, the UE may continue from block 1516 of FIG. 15A.

At block 1534, in an aspect, the UE may determine whether the two or more status bits are used or the single status bit is used for the plurality of acknowledgement data. For example, the status bit management circuitry 1344 shown and described above in connection with FIG. 13 may provide a means to determine whether the two or more status bits are used or the single status bit is used.

In an aspect, if the two or more status bits are used, at block 1536, for each set of the one or more sets of acknowledgement data, the UE may transmit a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded. For example, the communication management circuitry 1340 shown and described above in connection with FIG. 13 may provide a means to transmit the respective set of the one or more sets of acknowledgement data. In an aspect, the respective set of the one or more sets of acknowledgement data and the respective status bit of the at least one status bit may be transmitted within a same uplink slot.

At block 1538, in an aspect, for each set of the one or more sets of acknowledgement data, the UE may refrain from transmitting a respective set of the one or more sets of acknowledgement data when a respective status bit of the at least one status bit indicates that every downlink transmission in the plurality of downlink transmissions corresponding to the respective set of the one or more sets of acknowledgement data has been successfully decoded. For example, the communication management circuitry 1340 shown and described above in connection with FIG. 13 may provide a means to refrain from transmitting the respective set of the one or more sets of acknowledgement data.

In an aspect, if the single status bit is used, at block 1540, for each set of the one or more sets of acknowledgement data, the UE may transmit a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded. For example, the communication management circuitry 1340 shown and described above in connection with FIG. 13 may provide a means to transmit the respective set of the one or more sets of acknowledgement data.

In an aspect, the transmitting the at least the portion of the plurality of acknowledgement data at block 1540 may further include: transmitting one or more acknowledgement data of the at least the portion of the plurality of acknowledgement data and the single status bit within a same uplink slot.

In an aspect, the transmitting the at least the portion of the plurality of acknowledgement data at block 1540 may further include: transmitting remaining acknowledgement data of the at least the portion of the plurality of acknowledgement data within one or more other uplink slots.

At block 1542, in an aspect, for each set of the one or more sets of acknowledgement data, the UE may refrain from transmitting a respective set of the one or more sets of acknowledgement data when a respective status bit of the at least one status bit indicates that every downlink transmission in the plurality of downlink transmissions corresponding to the respective set of the one or more sets of acknowledgement data has been successfully decoded. For example, the communication management circuitry 1340 shown and described above in connection with FIG. 13 may provide a means to refrain from transmitting the respective set of the one or more sets of acknowledgement data.

At block 1544, the UE may continue to perform additional features, as described below.

Figure 15C:
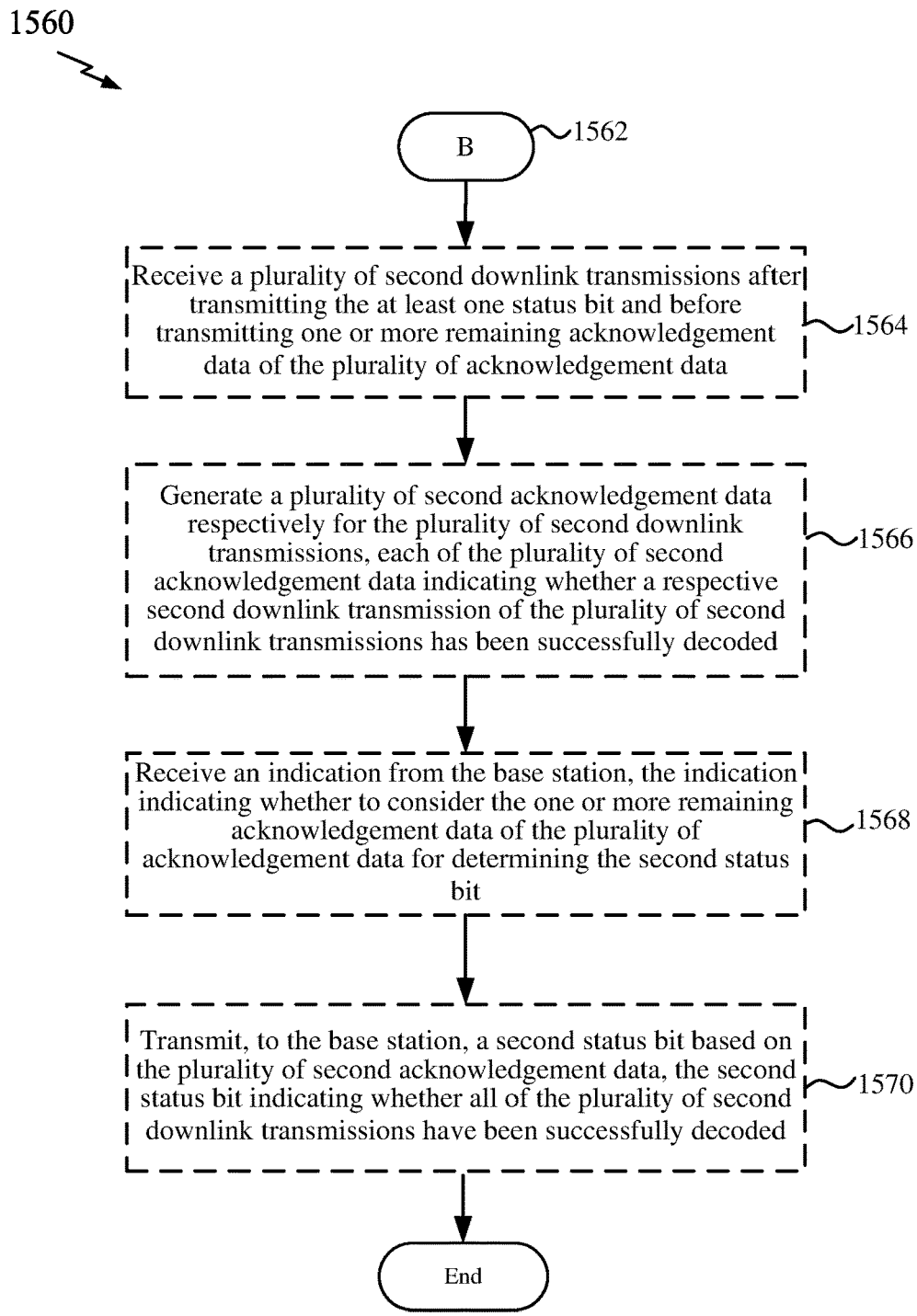
FIG. 15C is a flow chart illustrating an exemplary process for wireless communication in accordance with some aspects of the present disclosure.

FIG. 15C is a flow chart illustrating an exemplary process 1560 for wireless communication in accordance with some aspects of the present disclosure. The flow chart of FIG. 15C may be continued from the flow chart of FIG. 15B. As described below, some or all illustrated features may be omitted in a particular implementation within the scope of the present disclosure, and some illustrated features may not be required for implementation of all embodiments. In some examples, the process 1560 may be carried out by the UE 1300 illustrated in FIG. 13. In some examples, the process 1500 may be carried out by any suitable apparatus or means for carrying out the functions or algorithm described below.

At block 1562, the UE may continue from block 1544 of FIG. 15B.

At block 1564, in an aspect, the UE may receive a plurality of second downlink transmissions after transmitting the at least one status bit and before transmitting one or more remaining acknowledgement data of the plurality of acknowledgement data. For example, the communication management circuitry 1340 shown and described above in connection with FIG. 13 may provide a means to receive the plurality of second downlink transmissions.

At block 1566, in an aspect, the UE may generate a plurality of second acknowledgement data respectively for the plurality of second downlink transmissions, each of the plurality of second acknowledgement data indicating whether a respective second downlink transmission of the plurality of second downlink transmissions has been successfully decoded. For example, the acknowledgement data management circuitry 1342 shown and described above in connection with FIG. 13 may provide a means to generate the plurality of second acknowledgement data.

At block 1568, in an aspect, the UE may receive an indication from the base station, the indication indicating whether to consider the one or more remaining acknowledgement data of the plurality of acknowledgement data for determining the second status bit. For example, the communication management circuitry 1340 shown and described above in connection with FIG. 13 may provide a means to receive the plurality of downlink transmissions.

At block 1570, in an aspect, the UE may transmit, to the base station, a second status bit based on the plurality of second acknowledgement data, the second status bit indicating whether all of the plurality of second downlink transmissions have been successfully decoded. For example, the communication management circuitry 1340 and the status bit management circuitry 1344 shown and described above in connection with FIG. 13 may provide a means to transmit the second status bit. In an aspect, the second status bit may be determined based on the indication.

In one configuration, the UE 1300 for wireless communication includes means for receiving a plurality of downlink transmissions from a base station, means for generating a plurality of acknowledgement data respectively for the plurality of downlink transmissions, each of the plurality of acknowledgement data indicating whether a respective downlink transmission of the plurality of downlink transmissions has been successfully decoded, means for determining at least one status bit based on the plurality of acknowledgement data, the at least one status bit indicating whether all of the plurality of downlink transmissions have been successfully decoded, and means for transmitting, to the base station, the at least one status bit.

In an aspect, the UE 1300 may further include means for grouping the plurality of acknowledgement data into one or more sets of acknowledgement data, means for receiving, from a base station, a data set size of an acknowledgement data set, means for determining a number of resource blocks to be used for transmitting the at least one status bit based at least on the data set size. In an aspect, the UE 1300 may further include means for, for each set of the one or more sets of acknowledgement data, transmitting a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded, and means for, for each set of the one or more sets of acknowledgement data, refraining from transmitting a respective set of the one or more sets of acknowledgement data when a respective status bit of the at least one status bit indicates that every downlink transmission in the plurality of downlink transmissions corresponding to the respective set of the one or more sets of acknowledgement data has been successfully decoded. In an aspect, the UE 1300 may further include means for transmitting at least a portion of the plurality of acknowledgement data when the single status bit indicates that at least one downlink transmission in the plurality of downlink transmissions corresponding to the plurality of acknowledgement data has not been successfully decoded and means for refraining from transmitting the plurality of acknowledgement data when the single status bit indicates that every downlink transmission in the plurality of downlink transmissions corresponding to the plurality of acknowledgement data has been successfully decoded.

In an aspect, the UE 1300 may further include means for receiving a plurality of second downlink transmissions after transmitting the at least one status bit and before transmitting one or more remaining acknowledgement data of the plurality of acknowledgement data, means for determining a plurality of second acknowledgement data respectively for the plurality of second downlink transmissions, each of the plurality of second acknowledgement data indicating whether a respective second downlink transmission of the plurality of second downlink transmissions has been successfully decoded, and means for transmitting, to the base station, a second status bit based on the plurality of second acknowledgement data, the second status bit indicating whether all of the plurality of second downlink transmissions have been successfully decoded. In an aspect, the UE 1300 may further include means for receiving an indication from the base station, the indication indicating whether to consider the one or more remaining acknowledgement data of the plurality of acknowledgement data for determining the second status bit, and means for receiving a status bit configuration indicating whether to utilize two or more status bits or a single status bit for the plurality of acknowledgement data.

In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, and/or 3, and utilizing, for example, the processes and/or algorithms described herein in relation to FIG. 13.

Figure 16:
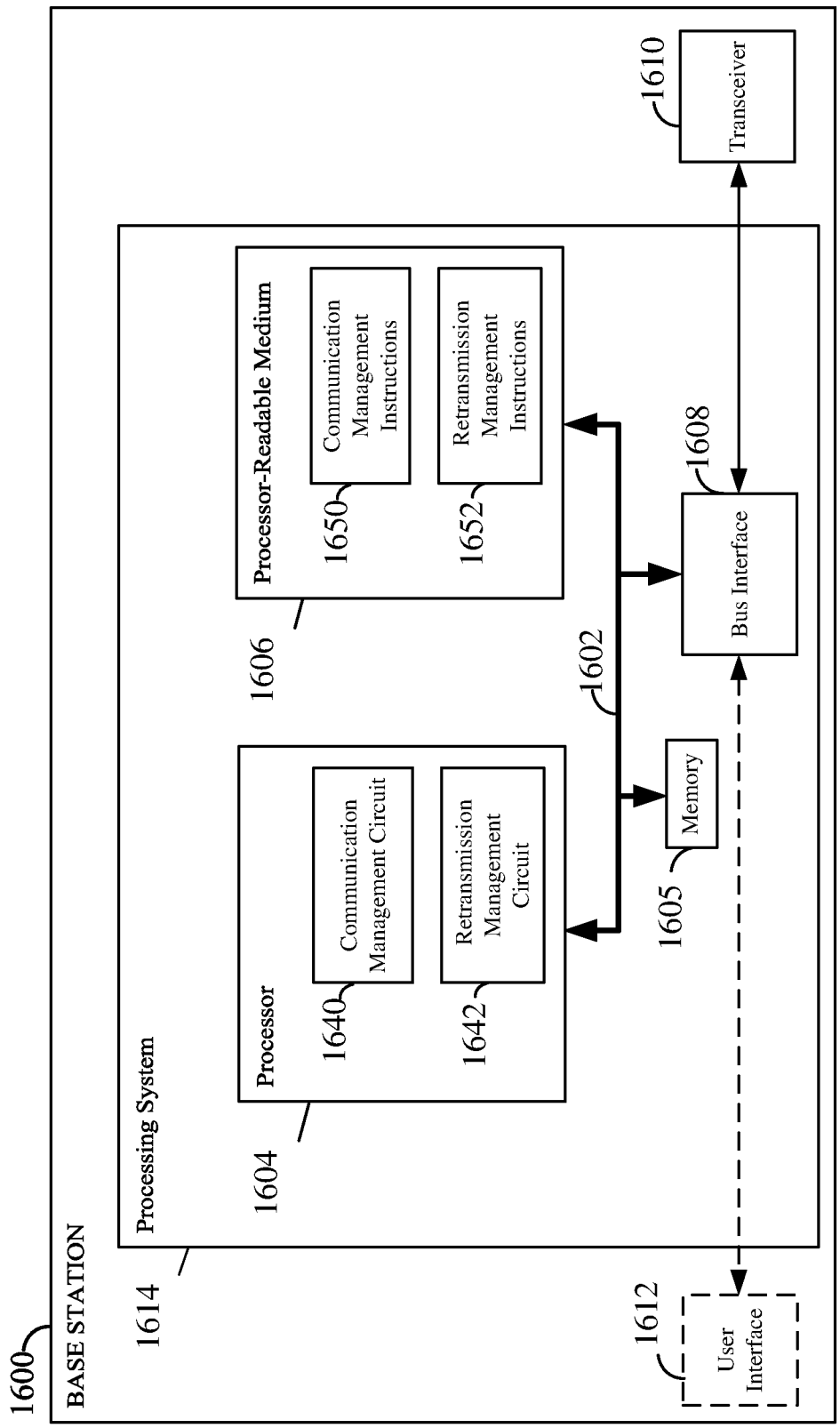
FIG. 16 is a block diagram conceptually illustrating an example of a hardware implementation for a base station according to some aspects of the disclosure.

FIG. 16 is a conceptual diagram illustrating an example of a hardware implementation for an exemplary base station 1600 employing a processing system 1614. In accordance with various aspects of the disclosure, an element, or any portion of an element, or any combination of elements may be implemented with a processing system 1614 that includes one or more processors 1604. For example, the base station 1600 may be a base station or a scheduling entity as illustrated in any one or more of FIGS. 1, 2, and/or 3.

The processing system 1614 may be substantially the same as the processing system 1314 illustrated in FIG. 13, including a bus interface 1608, a bus 1602, memory 1605, a processor 1604, and a computer-readable storage medium 1606. Furthermore, the base station 1600 may include a user interface 1612 and a transceiver 1610 substantially similar to those described above in FIG. 13. That is, the processor 1604, as utilized in a base station 1600, may be used to implement any one or more of the processes described below and illustrated in FIGS. 17-18. Of course, such a user interface 1312 is optional, and may be omitted in some examples, such as a base station.

In some aspects of the disclosure, the processor 1604 may include communication management circuitry 1640 configured for various functions, including, for example, transmitting a plurality of downlink transmissions to a user equipment (UE). For example, the communication management circuitry 1640 may be configured to implement one or more of the functions described below in relation to FIGS. 17-18, including, e.g., blocks 1702 and 1802. The communication management circuitry 1640 may further be configured to execute communication management software/instructions 1650 stored in the computer-readable storage medium 1606 to perform one or more of the functions described below in relation to FIGS. 17-18, including, e.g., blocks 1702 and 1802.

In some aspects of the disclosure, the communication management circuitry 1640 may be configured for various functions, including, for example, receiving, from the UE, at least one status bit indicating whether all of the plurality of downlink transmissions have been successfully decoded by the UE. For example, the communication management circuitry 1640 may be configured to implement one or more of the functions described below in relation to FIGS. 17-18, including, e.g., blocks 1704 and 1808. The communication management circuitry 1640 may further be configured to execute communication management software/instructions 1650 stored in the computer-readable storage medium 1606 to perform one or more of the functions described below in relation to FIGS. 17-18, including, e.g., blocks 1704 and 1808.

In some aspects, the communication management circuitry 1640 may be configured for various functions, including, for example, transmitting, to the UE, a data set size of an acknowledgement data. For example, the communication management circuitry 1640 may be configured to implement one or more of the functions described below in relation to FIG. 18, including, e.g., block 1804. The communication management circuitry 1640 may further be configured to execute communication management software/instructions 1650 stored in the computer-readable storage medium 1606 to perform one or more of the functions described below in relation to FIG. 18, including, e.g., block 1804.

In some aspects, the communication management circuitry 1640 may be configured for various functions, including, for example, transmitting, to the UE, a status bit configuration indicating whether to utilize two or more status bits or a single status bit for the plurality of acknowledgement data. For example, the communication management circuitry 1640 may be configured to implement one or more of the functions described below in relation to FIG. 18, including, e.g., block 1806. The communication management circuitry 1640 may further be configured to execute communication management software/instructions 1650 stored in the computer-readable storage medium 1606 to perform one or more of the functions described below in relation to FIG. 18, including, e.g., block 1806.

In some aspects, the communication management circuitry 1640 may be configured for various functions, including, for example, for each set of the one or more sets of acknowledgement data, receiving a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded. For example, the communication management circuitry 1640 may be configured to implement one or more of the functions described below in relation to FIG. 18, including, e.g., block 1810. The communication management circuitry 1640 may further be configured to execute communication management software/instructions 1650 stored in the computer-readable storage medium 1606 to perform one or more of the functions described below in relation to FIG. 18, including, e.g., block 1810.

In some aspects, the communication management circuitry 1640 may be configured for various functions, including, for example, receiving at least a portion of the plurality of acknowledgement data when the single status bit indicate that at least one downlink transmission in the plurality of downlink transmissions corresponding to the plurality of acknowledgement data has not been successfully decoded. For example, the communication management circuitry 1640 may be configured to implement one or more of the functions described below in relation to FIG. 18, including, e.g., block 1812. The communication management circuitry 1640 may further be configured to execute communication management software/instructions 1650 stored in the computer-readable storage medium 1606 to perform one or more of the functions described below in relation to FIG. 18, including, e.g., block 1812.

In some aspects, the communication management circuitry 1640 may be configured for various functions, including, for example, transmitting a plurality of second downlink transmissions to the UE after transmitting the at least one status bit and before receiving one or more remaining acknowledgement data of the plurality of acknowledgement data. For example, the communication management circuitry 1640 may be configured to implement one or more of the functions described below in relation to FIG. 18, including, e.g., block 1854. The communication management circuitry 1640 may further be configured to execute communication management software/instructions 1650 stored in the computer-readable storage medium 1606 to perform one or more of the functions described below in relation to FIG. 18, including, e.g., block 1854.

In some aspects, the communication management circuitry 1640 may be configured for various functions, including, for example, transmitting an indication to the UE, the indication indicating whether to consider the one or more remaining acknowledgement data of the plurality of acknowledgement data for determining the second status bit. For example, the communication management circuitry 1640 may be configured to implement one or more of the functions described below in relation to FIG. 18, including, e.g., block 1856. The communication management circuitry 1640 may further be configured to execute communication management software/instructions 1650 stored in the computer-readable storage medium 1606 to perform one or more of the functions described below in relation to FIG. 18, including, e.g., block 1856.

In some aspects, the communication management circuitry 1640 may be configured for various functions, including, for example, receiving, from the UE, a second status bit indicating whether all of the plurality of second downlink transmissions have been successfully decoded. For example, the communication management circuitry 1640 may be configured to implement one or more of the functions described below in relation to FIG. 18, including, e.g., block 1858. The communication management circuitry 1640 may further be configured to execute communication management software/instructions 1650 stored in the computer-readable storage medium 1606 to perform one or more of the functions described below in relation to FIG. 18, including, e.g., block 1858.

In some aspects of the disclosure, the processor 1604 may include retransmission management circuitry 1642 configured for various functions, including, for example, selectively retransmitting one or more of the plurality of downlink transmissions based on the at least one status bit. For example, the retransmission management circuitry 1642 may be configured to implement one or more of the functions described below in relation to FIG. 17-18, including, e.g., blocks 1706 and 1814. The retransmission management circuitry 1642 may further be configured to execute retransmission management software/instructions 1652 stored in the computer-readable storage medium 1606 to perform one or more of the functions described below in relation to FIGS. 17-18, including, e.g., blocks 1706 and 1814.

Figure 17:
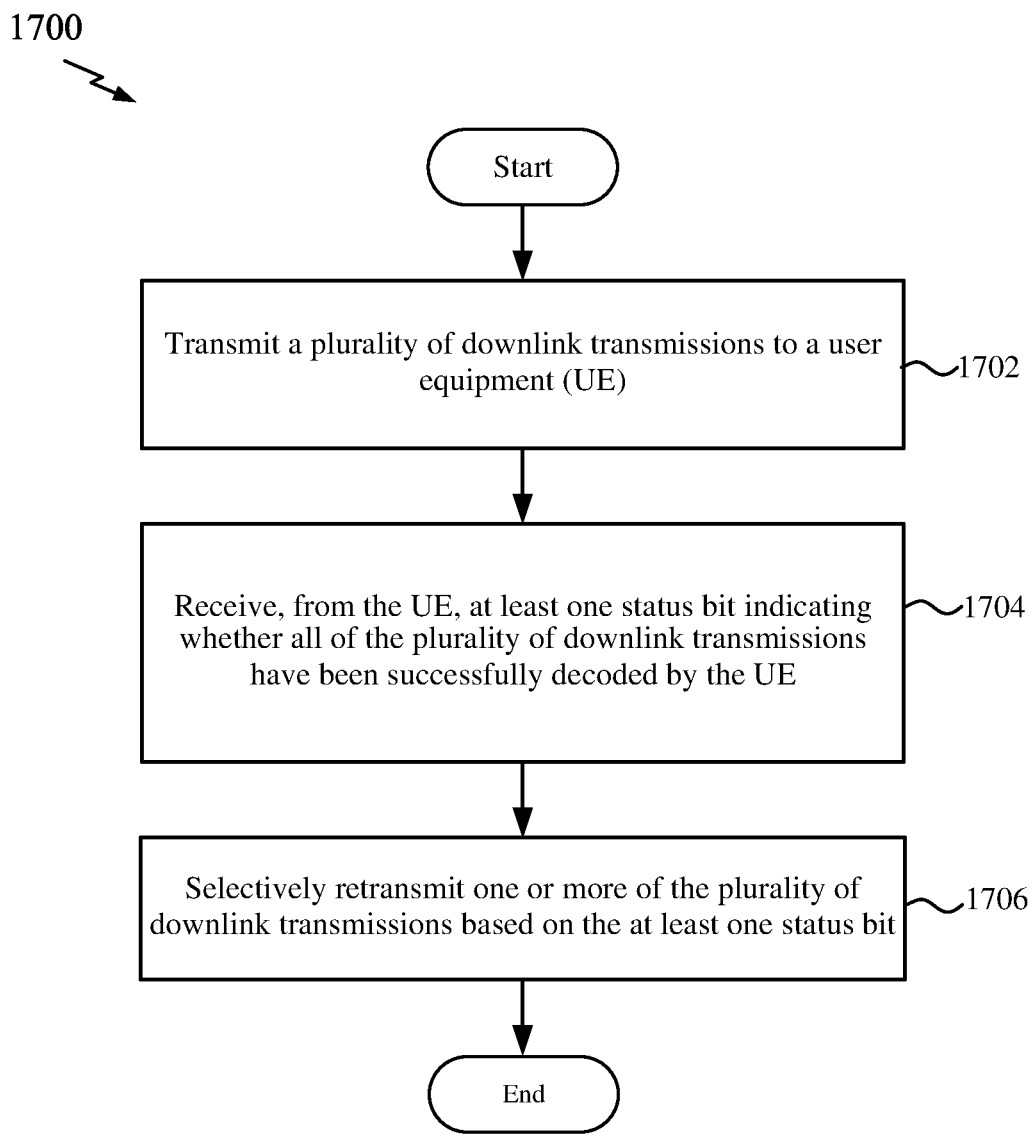
FIG. 17 is a flow chart illustrating an exemplary process for wireless communication according to some aspects of the disclosure.

FIG. 17 is a flow chart illustrating an exemplary process 1700 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the base station 1600 illustrated in FIG. 16. In some examples, the process 1700 may be carried out by any suitable apparatus or means for carrying out the functions or algorithm described below.

At block 1702, the base station may transmit a plurality of downlink transmissions to a UE. For example, the communication management circuitry 1640 shown and described above in connection with FIG. 16 may provide a means to transmit the plurality of downlink transmissions.

At block 1704, the base station may receive, from the UE, at least one status bit indicating whether all of the plurality of downlink transmissions have been successfully decoded by the UE. For example, the communication management circuitry 1640 shown and described above in connection with FIG. 16 may provide a means to receive the at least one status bit.

At block 1706, in an aspect, the base station may selectively retransmit one or more of the plurality of downlink transmissions based on the at least one status bit. For example, the retransmission management circuitry 1642 shown and described above in connection with FIG. 16 may provide a means to selectively retransmit one or more of the plurality of downlink transmissions.

In one configuration, the base station 1600 for wireless communication includes means for transmitting a plurality of downlink transmissions to a UE, and means for receiving, from the UE, at least one status bit indicating whether all of the plurality of downlink transmissions have been successfully decoded by the UE. The base station 1600 may further include means for selectively retransmitting one or more of the plurality of downlink transmissions based on the at least one status bit. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, and/or 3, and utilizing, for example, the processes and/or algorithms described herein in relation to FIGS. 16.

Figure 18A:
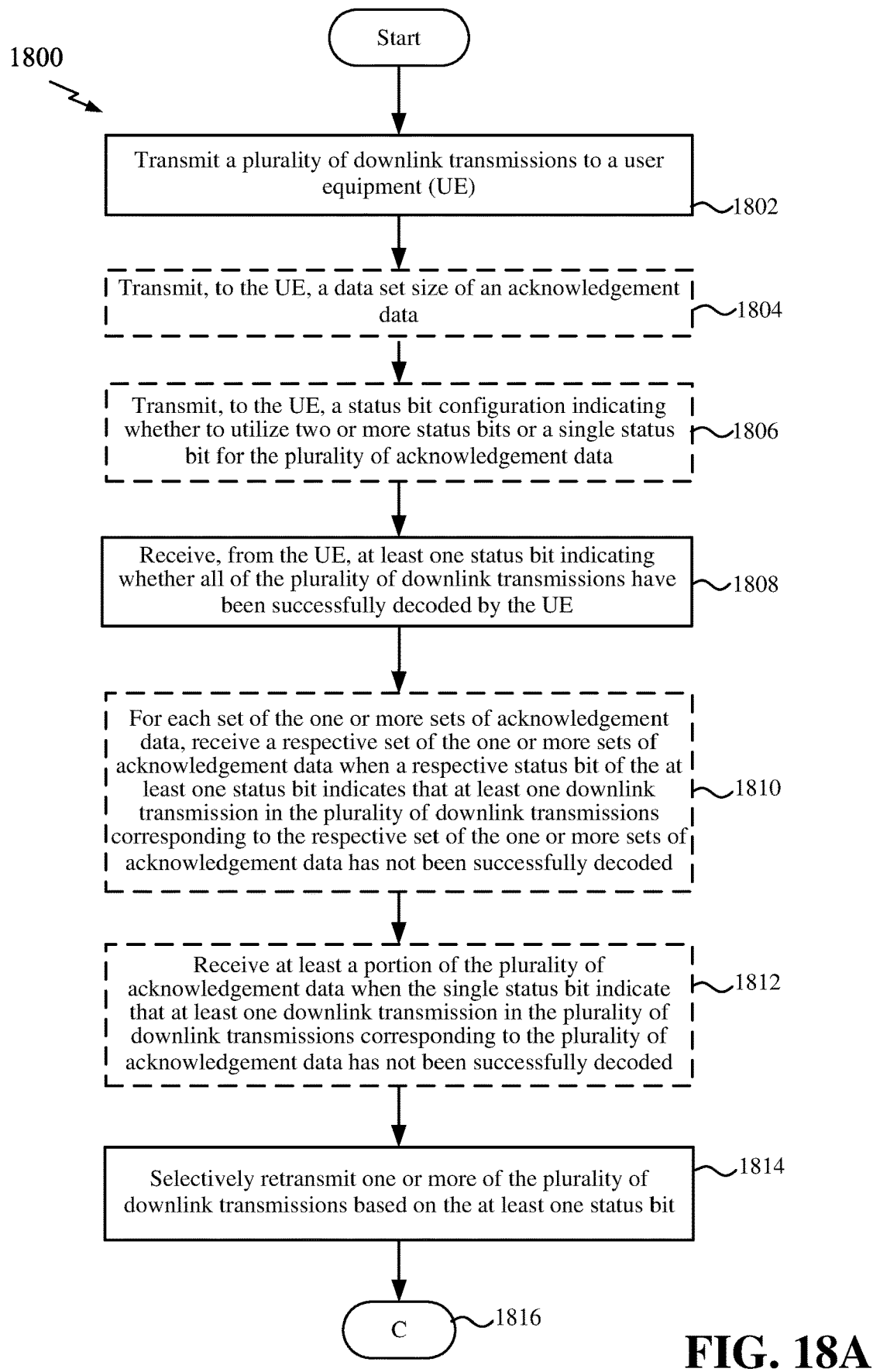
FIG. 18A is a flow chart illustrating an exemplary process for wireless communication according to some aspects of the disclosure.

FIG. 18A is a flow chart illustrating an exemplary process 1800 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the base station 1600 illustrated in FIG. 16. In some examples, the process 1800 may be carried out by any suitable apparatus or means for carrying out the functions or algorithm described below.

At block 1802, the base station may transmit a plurality of downlink transmissions to a UE. For example, the communication management circuitry 1640 shown and described above in connection with FIG. 16 may provide a means to transmit the plurality of downlink transmissions.

At block 1804, in an aspect, the base station may transmit, to the UE, a data set size of an acknowledgement data. For example, the communication management circuitry 1640 shown and described above in connection with FIG. 16 may provide a means to transmit the data set size.

In an aspect, the plurality of acknowledgement data may be grouped into one or more sets of acknowledgement data. In an aspect, a corresponding size of each set of the one or more sets of acknowledgement data may be based on the data set size. In an aspect, a number of resource blocks to be used for receiving the at least one status bit may be determined based at least on the data set size.

At block 1806, in an aspect, the base station may transmit, to the UE, a status bit configuration indicating whether to utilize two or more status bits or a single status bit for the plurality of acknowledgement data. For example, the communication management circuitry 1640 shown and described above in connection with FIG. 16 may provide a means to transmit the status bit configuration. In an aspect, the status bit configuration may be transmitted via at least one of an RRC message, MAC-CE, or DCI.

At block 1808, the base station may receive, from the UE, at least one status bit indicating whether all of the plurality of downlink transmissions have been successfully decoded by the UE. For example, the communication management circuitry 1640 shown and described above in connection with FIG. 16 may provide a means to receive the at least one status bit. In an aspect, the at least one status bit may be determined based on the status bit configuration. In an aspect, the plurality of downlink transmissions may be transmitted and the at least one status bit may be received according to a semi-persistent scheduling (SPS) configuration.

In an aspect, the at least one status bit may be determined based on a plurality of acknowledgement data respectively for the plurality of downlink transmissions, each of the plurality of acknowledgement data indicating whether a respective downlink transmission of the plurality of downlink transmissions has been successfully decoded. In an aspect, each of the plurality of acknowledgement data may indicate either an ACK to indicate that the respective downlink transmission of the plurality of downlink transmissions has been successfully decoded or a NACK to indicate that the respective downlink transmission has not been successfully decoded.

In an aspect, the plurality of acknowledgement data may include two or more sets of acknowledgement data and the at least one status bit includes two or more status bits respectively corresponding to the two or more sets of acknowledgement data, and each of the two or more status bits may indicate whether every downlink transmission in the plurality of downlink transmissions corresponding to a respective set of the two or more sets of acknowledgement data has been successfully decoded or not.

At block 1810, in an aspect, for each set of the one or more sets of acknowledgement data, the base station may receive a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded. For example, the communication management circuitry 1640 shown and described above in connection with FIG. 16 may provide a means to receive the respective set of the one or more sets of acknowledgement data. In an aspect, the respective set of the one or more sets of acknowledgement data and the respective status bit of the at least one status bit may be received within a same uplink slot.

In an aspect, the at least one status bit may include a single status bit corresponding to the plurality of acknowledgement data, and the single status bit may indicate whether every downlink transmission in the plurality of downlink transmissions corresponding to the plurality of acknowledgement data has been successfully decoded.

At block 1812, in an aspect, the base station may receive at least a portion of the plurality of acknowledgement data when the single status bit indicate that at least one downlink transmission in the plurality of downlink transmissions corresponding to the plurality of acknowledgement data has not been successfully decoded. For example, the communication management circuitry 1640 shown and described above in connection with FIG. 16 may provide a means to receive the at least a portion of the plurality of acknowledgement data.

In an aspect, the receiving the at least the portion of the plurality of acknowledgement data at block 1812 may further include: receiving one or more acknowledgement data of the at least the portion of the plurality of acknowledgement data and the single status bit are transmitted within a same uplink slot.

In an aspect, the receiving the at least the portion of the plurality of acknowledgement data at block 1812 may further include: receiving remaining acknowledgement data of the at least the portion of the plurality of acknowledgement data within one or more other uplink slots.

At block 1814, in an aspect, the base station may selectively retransmit one or more of the plurality of downlink transmissions based on the at least one status bit. For example, the retransmission management circuitry 1642 shown and described above in connection with FIG. 16 may provide a means to selectively retransmit one or more of the plurality of downlink transmissions.

At block 1816, the base station may continue to perform additional features, as described below.

Figure 18B:
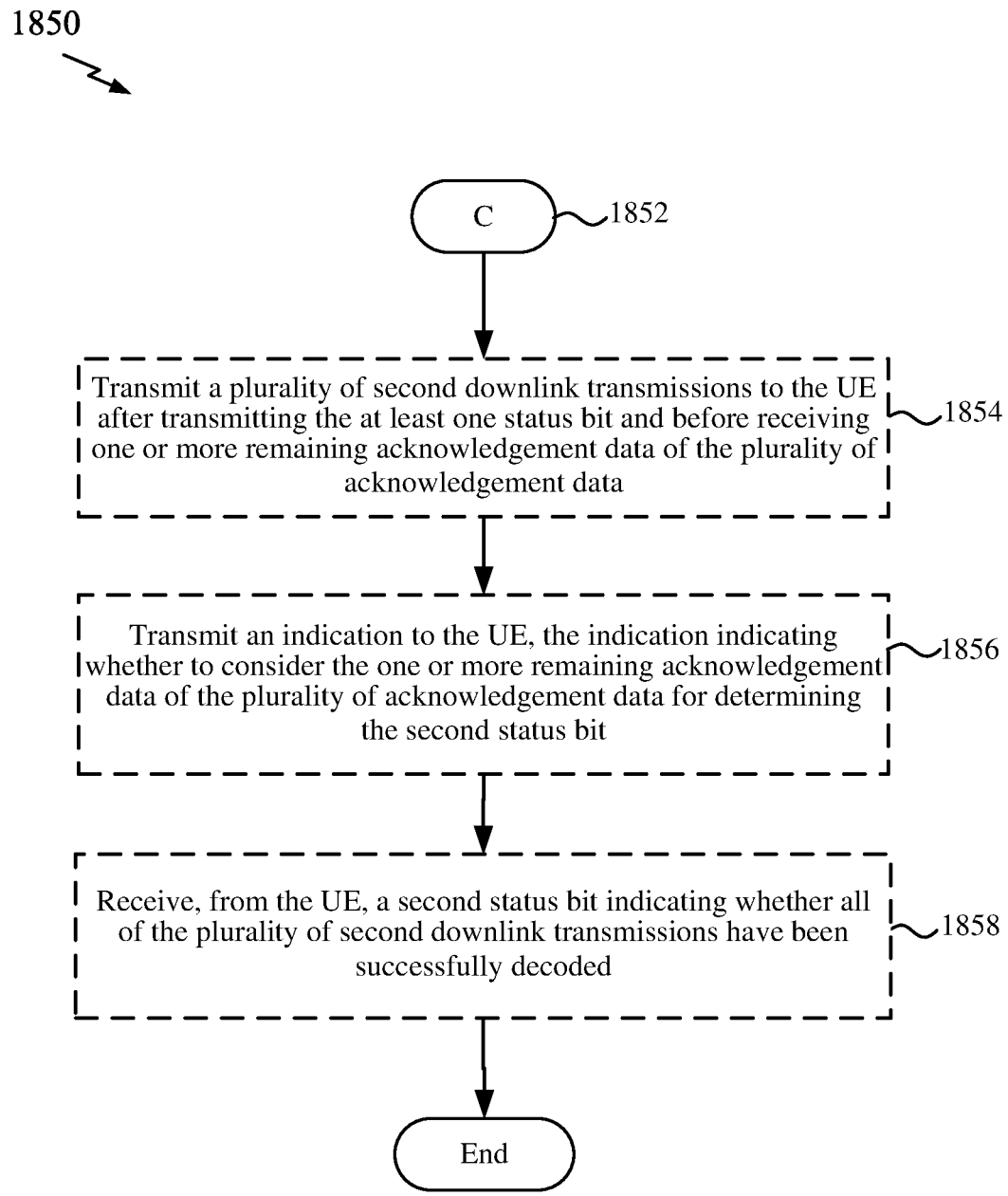
FIG. 18B is a flow chart illustrating an exemplary process for wireless communication according to some aspects of the disclosure.

FIG. 18B is a flow chart illustrating an exemplary process 1850 for wireless communication in accordance with some aspects of the present disclosure. The flow chart of FIG. 18B may be continued from the flow chart of FIG. 18A. As described below, some or all illustrated features may be omitted in a particular implementation within the scope of the present disclosure, and some illustrated features may not be required for implementation of all embodiments. In some examples, the process 1850 may be carried out by the base station 1600 illustrated in FIG. 16. In some examples, the process 1800 may be carried out by any suitable apparatus or means for carrying out the functions or algorithm described below.

At block 1852, the base station may continue from block 1816 of FIG. 18A.

At block 1854, in an aspect, the base station may transmit a plurality of second downlink transmissions to the UE after transmitting the at least one status bit and before receiving one or more remaining acknowledgement data of the plurality of acknowledgement data. For example, the communication management circuitry 1640 shown and described above in connection with FIG. 16 may provide a means to transmit the plurality of second downlink transmissions.

At block 1856, in an aspect, the base station may transmit an indication to the UE, the indication indicating whether to consider the one or more remaining acknowledgement data of the plurality of acknowledgement data for determining the second status bit. For example, the communication management circuitry 1640 shown and described above in connection with FIG. 16 may provide a means to transmit the indication.

At block 1858, in an aspect, the base station may receive, from the UE, a second status bit indicating whether all of the plurality of second downlink transmissions have been successfully decoded. For example, the communication management circuitry 1640 shown and described above in connection with FIG. 16 may provide a means to receive the second status bit.

In an aspect, the second status bit may be determined based on a plurality of second acknowledgement data respectively for the plurality of second downlink transmissions, each of the plurality of second acknowledgement data indicating whether a respective second downlink transmission of the plurality of second downlink transmissions has been successfully decoded. In an aspect, the second status bit may be determined further based on the one or more remaining acknowledgement data of the plurality of acknowledgement data, and the second status bit may indicate whether every second downlink transmission corresponding to the plurality of second downlink transmissions and one or more downlink transmissions in the plurality of downlink transmissions corresponding to the one or more remaining acknowledgement data have been successfully decoded. In an aspect, the second status bit may be determined based on the indication.

In one configuration, the base station 1600 for wireless communication includes means for transmitting a plurality of downlink transmissions to a UE, and means for receiving, from the UE, at least one status bit indicating whether all of the plurality of downlink transmissions have been successfully decoded by the UE. The base station 1600 may further include means for selectively retransmitting one or more of the plurality of downlink transmissions based on the at least one status bit.

The base station may further include means for transmitting, to the UE, a data set size of an acknowledgement data, means for transmitting an indication to the UE, the indication indicating whether to consider the one or more remaining acknowledgement data of the plurality of acknowledgement data for determining the second status bit, and means for transmitting, to the UE, a status bit configuration indicating whether to utilize two or more status bits or a single status bit for the plurality of acknowledgement data. The base station may further include means for, for each set of the one or more sets of acknowledgement data, receiving a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded. The base station may further include means for receiving at least a portion of the plurality of acknowledgement data when the single status bit indicate that at least one downlink transmission in the plurality of downlink transmissions corresponding to the plurality of acknowledgement data has not been successfully decoded. The base station may further include means for transmitting a plurality of second downlink transmissions to the UE after transmitting the at least one status bit and before receiving one or more remaining acknowledgement data of the plurality of acknowledgement data, and means for transmitting, from the UE, a second status bit indicating whether all of the plurality of second downlink transmissions have been successfully decoded. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, and/or 3, and utilizing, for example, the processes and/or algorithms described herein in relation to FIGS. 16.

The following provides an overview of several aspects of the present disclosure.

Aspect 1: A method of wireless communication by a user equipment (UE), comprising: receiving a plurality of downlink transmissions from a base station; generating a plurality of acknowledgement data respectively for the plurality of downlink transmissions, each of the plurality of acknowledgement data indicating whether a respective downlink transmission of the plurality of downlink transmissions has been successfully decoded; transmit, to the base station, a second status bit based on the plurality of second acknowledgement data, the second status bit indicating whether all of the plurality of second downlink transmissions have been successfully decoded.

Aspect 2: The method of aspect 1, wherein each of the plurality of acknowledgement data indicates either an acknowledgement (ACK) that the respective downlink transmission of the plurality of downlink transmissions has been successfully decoded or a negative acknowledgement (NACK) that the respective downlink transmission has not been successfully decoded.

Aspect 3: The method of aspect 1 or 2, further comprising: grouping the plurality of acknowledgement data into one or more sets of acknowledgement data.

Aspect 4: The method of aspect 3, further comprising: receiving, from a base station, a data set size of an acknowledgement data set, wherein a corresponding size of each set of the one or more sets of acknowledgement data is determined based on the data set size.

Aspect 5: The method of aspect 4, further comprising: determining a number of resource blocks to be used for transmitting the at least one status bit based at least on the data set size.

Aspect 6: The method of any of aspects 3-5, wherein the one or more sets of acknowledgement data include two or more sets of acknowledgement data and the at least one status bit includes two or more status bits respectively corresponding to the two or more sets of acknowledgement data, and wherein each of the two or more status bits indicates whether every downlink transmission in the plurality of downlink transmissions corresponding to a respective set of the two or more sets of acknowledgement data has been successfully decoded.

Aspect 7: The method of any of aspects 3-6, further comprising: for each set of the one or more sets of acknowledgement data, transmitting a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded.

Aspect 8: The method of aspect 7, wherein the respective set of the one or more sets of acknowledgement data and the respective status bit of the at least one status bit are transmitted within a same uplink slot.

Aspect 9: The method of aspect 7 or 8, further comprising: for each set of the one or more sets of acknowledgement data, refraining from transmitting a respective set of the one or more sets of acknowledgement data when a respective status bit of the at least one status bit indicates that every downlink transmission in the plurality of downlink transmissions corresponding to the respective set of the one or more sets of acknowledgement data has been successfully decoded.

Aspect 10: The method of aspect 1 or 2, wherein the at least one status bit includes a single status bit corresponding to the plurality of acknowledgement data, and wherein the single status bit indicates whether every downlink transmission in the plurality of downlink transmissions corresponding to the plurality of acknowledgement data has been successfully decoded.

Aspect 11: The method of aspect 10, further comprising: transmitting at least a portion of the plurality of acknowledgement data when the single status bit indicates that at least one downlink transmission in the plurality of downlink transmissions corresponding to the plurality of acknowledgement data has not been successfully decoded.

Aspect 12: The method of aspect 11, wherein the transmitting the at least the portion of the plurality of acknowledgement data further comprises: transmitting one or more acknowledgement data of the at least the portion of the plurality of acknowledgement data and the single status bit within a same uplink slot.

Aspect 13: The method of aspect 12, wherein the transmitting the at least the portion of the plurality of acknowledgement data further comprises: transmitting remaining acknowledgement data of the at least the portion of the plurality of acknowledgement data within one or more other uplink slots.

Aspect 14: The method of any of aspects 11-13, further comprising: refraining from transmitting the plurality of acknowledgement data when the single status bit indicates that every downlink transmission in the plurality of downlink transmissions corresponding to the plurality of acknowledgement data has been successfully decoded.

Aspect 15: The method of any of aspects 1-14, further comprising: receiving a plurality of second downlink transmissions after transmitting the at least one status bit and before transmitting one or more remaining acknowledgement data of the plurality of acknowledgement data; and generating a plurality of second acknowledgement data respectively for the plurality of second downlink transmissions, each of the plurality of second acknowledgement data indicating whether a respective second downlink transmission of the plurality of second downlink transmissions has been successfully decoded; and transmitting, to the base station, a second status bit based on the plurality of second acknowledgement data, the second status bit indicating whether all of the plurality of second downlink transmissions have been successfully decoded.

Aspect 16: The method of aspect 15, wherein the second status bit is determined further based on the one or more remaining acknowledgement data of the plurality of acknowledgement data, and wherein the second status bit indicates whether every second downlink transmission corresponding to the plurality of second downlink transmissions and one or more downlink transmissions in the plurality of downlink transmissions corresponding to the one or more remaining acknowledgement data have been successfully decoded.

Aspect 17: The method of aspect 15 or 16, further comprising: receiving an indication from the base station, the indication indicating whether to consider the one or more remaining acknowledgement data of the plurality of acknowledgement data for determining the second status bit, wherein the second status bit is determined based on the indication.

Aspect 18: The method of any of aspects 1-17, further comprising: receiving a status bit configuration indicating whether to utilize two or more status bits or a single status bit for the plurality of acknowledgement data, wherein the at least one status bit is determined based on the status bit configuration.

Aspect 19: The method of aspect 18, wherein the status bit configuration is received via at least one of an RRC message, MAC-CE, or DCI.

Aspect 20: The method of any of aspects 1-19, wherein the plurality of downlink transmissions are received and the at least one status bit are transmitted according to a semi-persistent scheduling (SPS) configuration.

Aspect 21: A user equipment (UE) comprising: a transceiver configured to communicate with a radio access network, a memory, and a processor communicatively coupled to the transceiver and the memory, wherein the processor and the memory are configured to perform any one of aspects 1 through 20.

Aspect 22: A UE configured for wireless communication comprising at least one means for performing any one of aspects 1 through 20.

Aspect 23: A non-transitory processor-readable storage medium having instructions for a UE thereon, wherein the instructions, when executed by a processing circuit, cause the processing circuit to perform any one of aspects 1 through 20.

Aspect 24: A method of wireless communication by a base station, comprising: transmitting a plurality of downlink transmissions to a user equipment (UE); receiving, from the UE, at least one status bit indicating whether all of the plurality of downlink transmissions have been successfully decoded by the UE; and selectively retransmitting one or more of the plurality of downlink transmissions based on the at least one status bit.

Aspect 25: The method of aspect 24, wherein the at least one status bit is determined based on a plurality of acknowledgement data respectively for the plurality of downlink transmissions, each of the plurality of acknowledgement data indicating whether a respective downlink transmission of the plurality of downlink transmissions has been successfully decoded.

Aspect 26: The method of aspect 25, wherein each of the plurality of acknowledgement data indicates either an acknowledgement (ACK) to indicate that the respective downlink transmission of the plurality of downlink transmissions has been successfully decoded or a negative acknowledgement (NACK) to indicate that the respective downlink transmission has not been successfully decoded.

Aspect 27: The method of aspect 25 or 26, wherein the plurality of acknowledgement data are grouped into one or more sets of acknowledgement data.

Aspect 28: The method of aspect 27, further comprising: transmitting, to the UE, a data set size of an acknowledgement data, wherein a corresponding size of each set of the one or more sets of acknowledgement data is based on the data set size.

Aspect 29: The method of aspect 28, wherein a number of resource blocks to be used for receiving the at least one status bit is determined based at least on the data set size.

Aspect 30: The method of aspect 27, wherein the plurality of acknowledgement data include two or more sets of acknowledgement data and the at least one status bit includes two or more status bits respectively corresponding to the two or more sets of acknowledgement data, and wherein each of the two or more status bits indicates whether every downlink transmission in the plurality of downlink transmissions corresponding to a respective set of the two or more sets of acknowledgement data has been successfully decoded or not.

Aspect 31: The method of any of aspects 27-30, further comprising: for each set of the one or more sets of acknowledgement data, receiving a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded.

Aspect 32: The method of aspect 31, wherein the respective set of the one or more sets of acknowledgement data and the respective status bit of the at least one status bit are received within a same uplink slot.

Aspect 33: The method of aspect 24 or 25, wherein the at least one status bit includes a single status bit corresponding to the plurality of acknowledgement data, and wherein the single status bit indicates whether every downlink transmission in the plurality of downlink transmissions corresponding to the plurality of acknowledgement data has been successfully decoded.

Aspect 34: The method of aspect 33, further comprising: receiving at least a portion of the plurality of acknowledgement data when the single status bit indicate that at least one downlink transmission in the plurality of downlink transmissions corresponding to the plurality of acknowledgement data has not been successfully decoded.

Aspect 35: The method of aspect 34, wherein the receiving the at least the portion of the plurality of acknowledgement data further comprises: receiving one or more acknowledgement data of the at least the portion of the plurality of acknowledgement data and the single status bit are transmitted within a same uplink slot.

Aspect 36: The method of aspect 35, wherein the receiving the at least the portion of the plurality of acknowledgement data further comprises: receiving remaining acknowledgement data of the at least the portion of the plurality of acknowledgement data within one or more other uplink slots.

Aspect 37: The method of any of aspects 24-36, further comprising: transmitting a plurality of second downlink transmissions to the UE after transmitting the at least one status bit and before receiving one or more remaining acknowledgement data of the plurality of acknowledgement data; and receiving, from the UE, a second status bit indicating whether all of the plurality of second downlink transmissions have been successfully decoded.

Aspect 38: The method of aspect 37, wherein the second status bit is determined based on a plurality of second acknowledgement data respectively for the plurality of second downlink transmissions, each of the plurality of second acknowledgement data indicating whether a respective second downlink transmission of the plurality of second downlink transmissions has been successfully decoded.

Aspect 39: The method of aspect 38, wherein the second status bit is determined further based on the one or more remaining acknowledgement data of the plurality of acknowledgement data, and wherein the second status bit indicates whether every second downlink transmission corresponding to the plurality of second downlink transmissions and one or more downlink transmissions in the plurality of downlink transmissions corresponding to the one or more remaining acknowledgement data have been successfully decoded.

Aspect 40: The method of aspect 38 or 39, further comprising: transmitting an indication to the UE, the indication indicating whether to consider the one or more remaining acknowledgement data of the plurality of acknowledgement data for determining the second status bit, wherein the second status bit is determined based on the indication.

Aspect 41: The method of any of aspects 25-40, further comprising: transmitting, to the UE, a status bit configuration indicating whether to utilize two or more status bits or a single status bit for the plurality of acknowledgement data, wherein the at least one status bit is determined based on the status bit configuration.

Aspect 42: The method of aspect 41, wherein the status bit configuration is transmitted via at least one of an RRC message, MAC-CE, or DCI.

Aspect 43: The method of any of aspects 24-42, wherein the plurality of downlink transmissions are transmitted and the at least one status bit are received according to a semi-persistent scheduling (SPS) configuration.

Aspect 44: A base station comprising: a transceiver configured to communicate with a radio access network, a memory, and a processor communicatively coupled to the transceiver and the memory, wherein the processor and the memory are configured to perform any one of aspects 24 through 43.

Aspect 45: A base station configured for wireless communication comprising at least one means for performing any one of aspects 24 through 43.

Aspect 46: A non-transitory processor-readable storage medium having instructions for a base station thereon, wherein the instructions, when executed by a processing circuit, cause the processing circuit to perform any one of aspects 24 through 43.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO).

Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:
   one or more processors;
   and
   one or more memories coupled to the one or more processors,
   wherein the one or more processors are configured to:
   receive a plurality of downlink transmissions from a radio access network (RAN) entity;
   generate a plurality of acknowledgement data respectively for the plurality of downlink transmissions, each of the plurality of acknowledgement data comprising respective hybrid automatic repeat request (HARQ) feedback indicating whether a respective downlink transmission of the plurality of downlink transmissions has been successfully decoded;
   receive, from the RAN entity, a data set size of an acknowledgement data set;
   transmit, to the RAN entity on a number of resource blocks based on at least the data set size, either (a) at least one status bit set to a first value without transmitting the plurality of acknowledgement data, or (b) the at least one status bit set to a second value and at least a portion of the plurality of acknowledgement data:
   wherein the at least one status bit set to the first value indicates that all of the plurality of downlink transmissions have been successfully decoded, and
   the at least one status bit set to the second value indicates that at least one downlink transmission in the plurality of downlink transmissions was not successfully decoded.

2. The UE of claim 1, wherein each of the plurality of acknowledgement data indicates either an acknowledgement (ACK) that the respective downlink transmission of the plurality of downlink transmissions has been successfully decoded or a negative acknowledgement (NACK) that the respective downlink transmission has not been successfully decoded.

3. The UE of claim 1, wherein the one or more processors are further configured to: group the plurality of acknowledgement data into one or more sets of acknowledgement data.

4. The UE of claim 3,
   wherein a corresponding size of each set of the one or more sets of acknowledgement data is determined based on the data set size.

5. The UE of claim 3, wherein the one or more sets of acknowledgement data include two or more sets of acknowledgement data and the at least one status bit includes two or more status bits respectively corresponding to the two or more sets of acknowledgement data, and
   wherein each of the two or more status bits indicates whether every downlink transmission in the plurality of downlink transmissions corresponding to a respective set of the two or more sets of acknowledgement data has been successfully decoded.

6. The UE of claim 3, wherein the one or more processors are further configured to:
for each set of the one or more sets of acknowledgement data, transmit a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded; and
for each set of the one or more sets of acknowledgement data, refrain from transmitting a respective set of the one or more sets of acknowledgement data when a respective status bit of the at least one status bit indicates that every downlink transmission in the plurality of downlink transmissions corresponding to the respective set of the one or more sets of acknowledgement data has been successfully decoded.

7. The UE of claim 1, wherein the at least one status bit includes a single status bit corresponding to the plurality of acknowledgement data, and
wherein the single status bit indicates whether every downlink transmission in the plurality of downlink transmissions corresponding to the plurality of acknowledgement data has been successfully decoded.

8. The UE of claim 7, wherein the one or more processors are further configured to:
transmit the at least the portion of the plurality of acknowledgement data when the single status bit indicates that at least one downlink transmission in the plurality of downlink transmissions corresponding to the plurality of acknowledgement data has not been successfully decoded; and
refrain from transmitting the plurality of acknowledgement data when the single status bit indicates that every downlink transmission in the plurality of downlink transmissions corresponding to the plurality of acknowledgement data has been successfully decoded.

9. The UE of claim 8, wherein the one or more processors configured to transmit the at least the portion of the plurality of acknowledgement data are further configured to:
transmit one or more acknowledgement data of the at least the portion of the plurality of acknowledgement data and the single status bit within a same uplink slot; and
transmit remaining acknowledgement data of the at least the portion of the plurality of acknowledgement data within one or more other uplink slots.

10. The UE of claim 1, wherein the at least the portion of the plurality of acknowledgement data is transmitted, and wherein the one or more processors are further configured to:
receive a plurality of second downlink transmissions after transmitting the at least one status bit and before transmitting one or more remaining acknowledgement data of the plurality of acknowledgement data, the one or more remaining acknowledgement data being a remaining portion of the plurality of acknowledgement data not transmitted when transmitting the at least the portion of the plurality of acknowledgement data;
generate a plurality of second acknowledgement data respectively for the plurality of second downlink transmissions, each of the plurality of second acknowledgement data indicating whether a respective second downlink transmission of the plurality of second downlink transmissions has been successfully decoded; and
transmit, to the RAN entity, a second status bit based on the plurality of second acknowledgement data, the second status bit indicating whether all of the plurality of second downlink transmissions have been successfully decoded.

11. The UE of claim 10, wherein the second status bit is determined further based on the one or more remaining acknowledgement data of the plurality of acknowledgement data, and
wherein the second status bit indicates whether every second downlink transmission corresponding to the plurality of second downlink transmissions and one or more downlink transmissions in the plurality of downlink transmissions corresponding to the one or more remaining acknowledgement data have been successfully decoded.

12. The UE of claim 10, wherein the one or more processors are further configured to:
receive an indication from the RAN entity, the indication indicating whether to consider the one or more remaining acknowledgement data of the plurality of acknowledgement data for determining the second status bit,
wherein the second status bit is determined based on the indication.

13. The UE of claim 1, wherein the one or more processors are further configured to:
receive a status bit configuration indicating whether to utilize two or more status bits or a single status bit for the plurality of acknowledgement data,
wherein the at least one status bit is determined based on the status bit configuration.

14. The UE of claim 1, wherein at least one status bit corresponds to the plurality of acknowledgement data based on an order of the reception of the plurality of acknowledgement data.

15. A method of wireless communication by a user equipment (UE), comprising:
receiving a plurality of downlink transmissions from a radio access network (RAN) entity;
generating a plurality of acknowledgement data respectively for the plurality of downlink transmissions, each of the plurality of acknowledgement data comprising respective hybrid automatic repeat request (HARQ) feedback indicating whether a respective downlink transmission of the plurality of downlink transmissions has been successfully decoded;
receiving, from the RAN entity, a data set size of an acknowledgement data set;
transmitting, to the RAN entity on a number of resource blocks based on at least the data set size, either (a) at least one status bit set to a first value without transmitting the plurality of acknowledgement data, or (b) the at least one status bit set to a second value and at least a portion of the plurality of acknowledgement data;
wherein the at least one status bit set to the first value indicates that all of the plurality of downlink transmissions have been successfully decoded, and
the at least one status bit set to the second value indicates that at least one downlink transmission in the plurality of downlink transmissions was not successfully decoded.

16. radio access network (RAN) entity for wireless communication, comprising:
one or more processors;
and one or more memories coupled to the one or more processors, wherein the one or more processors are configured to:
- transmit a plurality of downlink transmissions to a user equipment (UE);
- transmit, to the UE, a data set size of an acknowledgement data;
- receive, from the UE on a number of resource blocks based on at least the data set size, either (a) at least one status bit set to a first value without receiving the plurality of acknowledgement data, or (b) the at least one status bit set to a second value and at least a portion of the plurality of acknowledgement data:
  - wherein the at least one status bit set to the first value indicates that all of the plurality of downlink transmissions have been successfully decoded, and
- the at least one status bit set to the second value indicates that at least one downlink transmission in the plurality of downlink transmissions was not successfully decoded; and
- selectively retransmit one or more of the plurality of downlink transmissions based on the at least one status bit,
- wherein the at least one status bit is determined based on a plurality of acknowledgement data respectively for the plurality of downlink transmissions, each of the plurality of acknowledgement data including respective hybrid automatic repeat request (HARQ) feedback indicating whether a respective downlink transmission of the plurality of downlink transmissions has been successfully decoded.

17. The RAN entity of claim 16, wherein each of the plurality of acknowledgement data indicates either an acknowledgement (ACK) to indicate that the respective downlink transmission of the plurality of downlink transmissions has been successfully decoded or a negative acknowledgement (NACK) to indicate that the respective downlink transmission has not been successfully decoded.

18. The RAN entity of claim 16, wherein the plurality of acknowledgement data are grouped into one or more sets of acknowledgement data.

19. The RAN entity of claim 18, wherein
a corresponding size of each set of the one or more sets of acknowledgement data is based on the data set size.

20. The RAN entity of claim 18, wherein the plurality of acknowledgement data comprise two or more sets of acknowledgement data and the at least one status bit includes two or more status bits respectively corresponding to the two or more sets of acknowledgement data, and
wherein each of the two or more status bits indicates whether every downlink transmission in the plurality of downlink transmissions corresponding to a respective set of the two or more sets of acknowledgement data has been successfully decoded or not.

21. The RAN entity of claim 18, wherein the one or more processors are further configured to:
for each set of the one or more sets of acknowledgement data, receive a respective set of the one or more sets of acknowledgement data when a respective status bit of the at least one status bit indicates that at least one downlink transmission in the plurality of downlink transmissions corresponding to the respective set of the one or more sets of acknowledgement data has not been successfully decoded.

22. The RAN entity of claim 16, wherein the at least one status bit includes a single status bit corresponding to the plurality of acknowledgement data, and
wherein the single status bit indicates whether every downlink transmission in the plurality of downlink transmissions corresponding to the plurality of acknowledgement data has been successfully decoded.

23. The RAN entity of claim 22, wherein the one or more processors are further configured to:
receive the at least the portion of the plurality of acknowledgement data when the single status bit indicate that at least one downlink transmission in the plurality of downlink transmissions corresponding to the plurality of acknowledgement data has not been successfully decoded.

24. The base station RAN entity of claim 23, wherein the one or more processors are configured to receive the at least the portion of the plurality of acknowledgement data is further configured to:
receive one or more acknowledgement data of the at least the portion of the plurality of acknowledgement data and the single status bit are transmitted within a same uplink slot; and
receive remaining acknowledgement data of the at least the portion of the plurality of acknowledgement data within one or more other uplink slots.

25. The RAN entity of claim 16, wherein the at least the portion of the plurality of acknowledgement data is received, and wherein the one or more processors are further configured to:
transmit a plurality of second downlink transmissions to the UE after transmitting the at least one status bit and before receiving one or more remaining acknowledgement data of the plurality of acknowledgement data, the one or more remaining acknowledgement data being a remaining portion of the plurality of acknowledgement data not received when receiving the at least the portion of the plurality of acknowledgement data; and
receive, from the UE, a second status bit indicating whether all of the plurality of second downlink transmissions have been successfully decoded,
wherein the second status bit is determined based on a plurality of second acknowledgement data respectively for the plurality of second downlink transmissions, each of the plurality of second acknowledgement data indicating whether a respective second downlink transmission of the plurality of second downlink transmissions has been successfully decoded.

26. The RAN entity of claim 25, wherein the second status bit is determined further based on the one or more remaining acknowledgement data of the plurality of acknowledgement data, and
wherein the second status bit indicates whether every second downlink transmission corresponding to the plurality of second downlink transmissions and one or more downlink transmissions in the plurality of downlink transmissions corresponding to the one or more remaining acknowledgement data have been successfully decoded.

27. The RAN entity of claim 25, wherein the one or more processors are further configured to:
transmit an indication to the UE, the indication indicating whether to consider the one or more remaining acknowledgement data of the plurality of acknowledgement data for determining the second status bit,
wherein the second status bit is determined based on the indication.

28. The RAN entity of claim 16, wherein the one or more processors are further configured to:

transmit, to the UE, a status bit configuration indicating whether to utilize two or more status bits or a single status bit for the plurality of acknowledgement data, wherein the at least one status bit is determined based on the status bit configuration.

29. A method of wireless communication by a radio access network (RAN) entity, comprising:

transmitting a plurality of downlink transmissions to a user equipment (UE);

transmitting, to the UE, a data set size of an acknowledgement data;

receiving, from the UE on a number of resource blocks based on at least the data set size, either (a) at least one status bit set to a first value without receiving the plurality of acknowledgement data, or (b) the at least one status bit set to a second value and at least a portion of the plurality of acknowledgement data;

wherein the at least one status bit set to the first value indicates that all of the plurality of downlink transmissions have been successfully decoded, and the at least one status bit set to the second value indicates that at least one downlink transmission in the plurality of downlink transmissions was not successfully decoded; and selectively retransmitting one or more of the plurality of downlink transmissions based on the at least one status bit, wherein the at least one status bit is determined based on a plurality of acknowledgement data respectively for the plurality of downlink transmissions, each of the plurality of acknowledgement data including respective hybrid automatic repeat request (HARQ) feedback indicating whether a respective downlink transmission of the plurality of downlink transmissions has been successfully decoded.

* * * * *